(12) United States Patent
Horsley et al.

(10) Patent No.: US 6,464,026 B1
(45) Date of Patent: Oct. 15, 2002

(54) CONTROL SYSTEM FOR PARALLEL HYBRID VEHICLE

(76) Inventors: John Horsley, 51, The Green, Barton-under-Needwood Staffs DE138JD (GB); Peter Monkhouse, 39 High Bank Road, Burton on Trent (GB); Dan Rendell, 34 Drage Street, Derby (GB); Donald E. Panoz, 1875 Kathy Whitworth Dr., Braselton, GA (US) 30517

( * ) Notice: Subject to any disclaimer, the term of this patent is extended or adjusted under 35 U.S.C. 154(b) by 0 days.

(21) Appl. No.: 09/169,611

(22) Filed: Oct. 9, 1998

(51) Int. Cl.$^7$ ................................................ B60K 6/02
(52) U.S. Cl. ........................ 180/65.2; 180/65.1; 701/22
(58) Field of Search .............................. 180/65.1, 65.2, 180/65.3; 477/2, 3; 60/716, 711, 718; 701/22

(56) References Cited

U.S. PATENT DOCUMENTS

| | | | | |
|---|---|---|---|---|
| 4,335,429 A | * | 6/1982 | Kawakatsu ................. | 364/424 |
| 4,407,132 A | | 10/1983 | Kawakatsu et al. .......... | 60/716 |
| 5,343,970 A | | 9/1994 | Severinksy ................ | 180/65.2 |
| 5,377,791 A | * | 1/1995 | Kawashima ................ | 188/159 |
| 5,566,774 A | * | 10/1996 | Yoshida .................... | 180/65.4 |
| 5,656,921 A | | 8/1997 | Farrall ......................... | 322/40 |
| 5,951,614 A | * | 9/1999 | Tabata et al. ................ | 701/54 |
| 5,965,991 A | * | 10/1999 | Koike et al. ................ | 318/139 |
| 5,984,033 A | * | 11/1999 | Tamagawa et al. ........ | 180/65.2 |
| 6,003,626 A | * | 12/1999 | Ibaraki et al. ............. | 180/65.2 |

FOREIGN PATENT DOCUMENTS

EP           0511654        * 11/1992      ................ 180/65.2

\* cited by examiner

*Primary Examiner*—Brian L. Johnson
*Assistant Examiner*—Hau Phan
(74) *Attorney, Agent, or Firm*—Troutman Sanders LLP; Gerald R. Boss

(57) ABSTRACT

A vehicular power system for powering a parallel hybrid vehicle having an internal combustion engine, electric motor/generator, ESD source, and an inverter includes a set of demand parameters for controlling the amount of flow of current between the ESD source and the electric motor/generator. The demand parameters are utilized by the inverter for controlling this current. A set of limiting parameters which indicate that the application of full demand would jeopardize the operational environment or is unwarranted by utilizing the limit of full demand. The demand parameters control the amount of current to the electric motor/generator from the ESD during an electric motor/generator assist mode and from the electric motor/generator to the ESD when the battery is acting as a generator for recharging the ESD. Additionally, a plurality of demand parameters may exist providing options for manipulating the control of the electric motor/generator depending upon the operating environment of the vehicle.

2 Claims, 29 Drawing Sheets

ZS04D201 | Auto ▼ | [icons] | A

THROT/RPM D/R DEMAND
OFFLINE

| | | 0 0 | 1 1500 | 2 3000 | 3 3500 | 4 4000 | 5 4500 | 6 5000 | 7 5250 | 8 5500 | 9 5750 | 10 6000 |
|---|---|---|---|---|---|---|---|---|---|---|---|---|
| A | 0 | 0.36 | 0 | -1 | -4 | -8 | -13 | -17 | -21 | -25 | -25 | -35 | -50 |
| C | 1 | 0.42 | 0 | -1 | -4 | -8 | -13 | -17 | -21 | -25 | -25 | -35 | -50 |
| C | 2 | 0.49 | 0 | -1 | -4 | -8 | -13 | -17 | -21 | -25 | -25 | -35 | -50 |
| E | 3 | 0.58 | 0 | -1 | -4 | -8 | -13 | -17 | -21 | -25 | -25 | -35 | -50 |
| L | 4 | 0.69 | 0 | -1 | -4 | -8 | -13 | -17 | -21 | -25 | -25 | -35 | -50 |
| | 5 | 0.83 | 0 | -1 | -4 | -8 | -13 | -17 | -21 | -25 | -25 | -35 | -35 |
| P | 6 | 0.97 | 0 | -1 | -4 | -8 | -13 | -17 | -21 | -25 | -25 | -25 | -25 |
| E | 7 | 1.15 | 0 | -1 | -3 | -5 | -3 | -6 | -6 | -6 | -6 | -6 | -6 |
| D | 8 | 1.36 | 0 | 0 | 0 | 0 | 0 | 0 | 0 | 0 | 0 | 0 | 0 |
| A | 9 | 1.61 | 0 | 0 | 0 | 0 | 5 | 7 | 8 | 10 | 10 | 10 | 10 |
| L | 10 | 1.88 | 0 | 0 | 0 | 0 | 10 | 14 | 16 | 20 | 20 | 20 | 20 |
| | 11 | 2.18 | 0 | 5 | 10 | 15 | 20 | 25 | 30 | 40 | 50 | 50 | 50 |
| ( | 12 | 2.52 | 0 | 5 | 10 | 15 | 30 | 50 | 70 | 70 | 70 | 70 | 70 |
| V | 13 | 2.93 | 0 | | | | | | | | | | |
| O | 14 | 3.44 | 0 | | | | | | | | | | |
| L | 15 | 4.16 | 0 | | | | | | | | | | |
| TS) | | | | | | | | | | | | | |

AVERAGE ENG RPM (ENG RPM)

PRIMARY DATA FILE | THROT/RPM D/R DEMAND (%)
PA210111 | F1-HELP ESC-EXIT

FIG. 4

Check the following detectors:

- Battery Voltage (module)
- Battery Temperature
- Battery Voltage (isolated)
- Switch Temperature
- Motor Temperatures
- Traction Control

FIG.10

Check the following detectors:

- Battery Voltage (module)
- Battery Temperature
- Battery Voltage (isolated)
- Switch Temperature
- Battery Current
- Battery Venting Pressure

FIG.11

CONTROL SYSTEM FOR PARALLEL HYBRID VEHICLE

BACKGROUND OF THE INVENTION

This invention relates generally to a vehicular power system and more particularly to a parallel hybrid system which utilizes an internal combustion engine in combination with an electric motor/generator ("EMG") for applying torque to the drive train of a vehicle. An EMG control system manipulates and controls the contribution of torque delivered to the drive train from the EMG depending on conditions present in the operating environment of the vehicle and also controls the charging of a storage device by the EMG.

Vehicles such as automobiles and trains have long been powered by hybrid power systems. Such hybrid systems may include the combination of an internal combustion engine with an EMG to power the vehicle. In "serial" hybrid systems, an EMG or EMGs power the drive wheels of the vehicle while the internal combustion engine manipulates a generator for recharging an electrical power storage device (e.g., a battery, capacitor, flywheel, etc.) which in turn powers the EMG(s). In "parallel" hybrid vehicles, both the internal combustion engine and EMG may directly power the drive train of the vehicle. Typically, in most parallel hybrid designs, the drive train is powered either by the internal combustion engine alone or the EMG, but seldom together. Moreover, most parallel hybrid systems to date have been concerned primarily with reducing the emissions from the vehicle while still providing sufficient power for desired operation. In such vehicles, the EMG is utilized for start-up operations and relatively slow speed operation while the internal combustion engine is utilized for high speed operation.

U.S. Pat. No. 5,343,970 discloses the use of an EMG to provide assistance to the torque generated by the internal combustion engine in order to accelerate an automobile or to help power an automobile up a hill. U.S. Pat. No. 5,656,921 discloses the use of fuzzy logic as a control mechanism for a parallel hybrid powertrain.

The random application of EMG assistance is not efficient and may not be beneficial unless effectively controlled. The controlled application of EMG assistance is essential to ensure that the stability and overall performance of the hybrid vehicle may be maintained. Also, the haphazard application of EMG assistance may deplete the energy source thus preventing further EMG assistance from being available.

In applications such as highway driving, a vehicle must operate at relatively high speeds for long periods of time. Road racing in rallies presents even more extreme demands. For example, at the race held yearly in LeMans, France, high performance automobiles are required to operate continuously for twenty-four hours. The winner of the race is the automobile which has traveled the farthest in that time period. Consequently, the performance and durability of the power system, in addition to the effective management of race-restricted resources such as gasoline and tires, are essential to win such a race. In order for a hybrid automobile to operate in such an extended environment, the management of the power system is critical to ensure that the EMG assist capability of the EMG is utilized effectively, so that it will be available throughout the course of the race despite the limited capacity of any energy storage device. For example, the capacity of a storage battery is limited since the performance of the automobile is effected by its overall weight, and it is infeasable and counter-productive to have an overlarge battery system. Furthermore, it is desirable that in addition to providing additional torque, the EMG be able to operate at its optimum level enhancing the overall performance of the hybrid vehicle.

Thus, while hybrid systems have been known to operate vehicles, it is desirable to provide an EMG control system which may optimize and efficiently utilize the limited resources of the hybrid system under a variety of operating conditions. Also, since vehicles are utilized in many driving circumstances, it is desirable to provide a EMG control system which is adaptable to optimize performance for the current operating conditions of the vehicle.

Accordingly, it is an objective of the present invention to provide a parallel hybrid system which optimizes and efficiently utilizes an EMG to enhance the performance of a hybrid vehicle.

Also, it is an objective of the present invention to maximize EMG assistance and the regeneration of the power storage device when the surrounding operational parameters permit.

Additionally, it is an objective of the present invention to control the EMG assist and regeneration functions in a manner conducive to the operating environment.

It is also an objective of the present invention to provide a parallel hybrid system which is capable of providing the performance characteristics necessary for winning road races, such as The Twenty-four Hours of LeMans, by providing a smart control system for operating the EMG assist of an EMG.

SUMMARY

In accordance with the invention therefore, a parallel hybrid power system is provided, including an internal combustion engine powered by fossil fuels. An EMG driven by an energy storage device ("ESD") is utilized for powering the vehicle. The ESD, in practice, could be a cell, a battery, a capacitor, a flywheel, or any of the means known to those skilled in the art for storage of energy. An EMG controller controls the amount of electrical current flow in both directions between the ESD and the EMG. A first set of demand parameters directs the EMG controller to control the amount of current which flows between the ESD and the EMG. This current may be utilized either to drive the EMG ("EMG assist") or to recharge the ESD ("regeneration"). A set of limiting parameters representing the operating parameters of the system (e.g., battery temperature) are present for limiting the amount of demand of current between the EMG and the ESD. The limiting parameters may override or modify the effect of the demand parameters when predetermined operating conditions indicate that satisfying the requested demand of the demand parameters would jeopardize the operation of the vehicle.

Also, the vehicular power system may utilize other sets of demand parameters for manipulating the current flow between the ESD and EMG depending on the operational environment. This provides the vehicle with flexibility in different driving conditions.

BRIEF DESCRIPTION OF DRAWINGS

A presently preferred by nonetheless merely illustrative invention will hereinafter be described, together with other features thereof. It will be appreciated however, that other embodiments of the invention will be readily apparent to those skilled in the art.

The invention will be more readily understood from a reading of the following specification and by reference to the accompanying drawings forming a part thereof, wherein an example of the invention is shown and wherein:

FIG. 4 illustrates a demand map for controlling EMG assist and regeneration according to the present invention;

FIG. 10 is a flow chart illustrating the checking of EMG faults for determining limiting of EMG assist according to the present invention;

FIG. 11 is a flow chart illustrating the checking of limiting parameters of regeneration according to the present invention;

DESCRIPTION OF THE PREFERRED EMBODIMENT

Figure 1A:
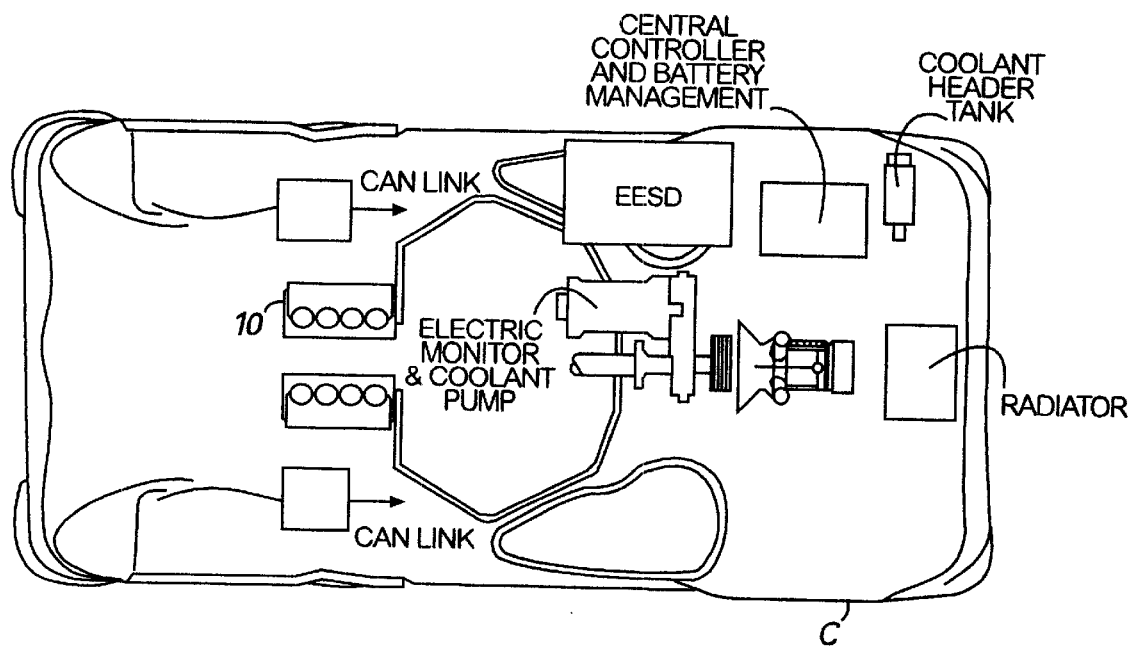
FIG. 1A illustrates a top view of an automobile utilizing a parallel hybrid power source according to the present invention.
Figure 1B:
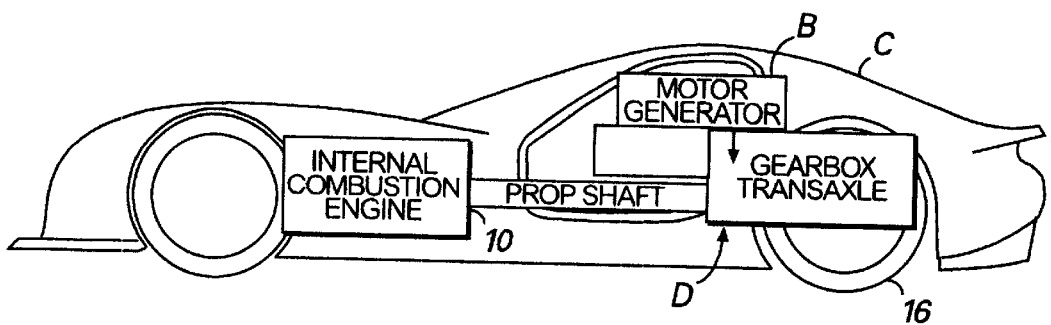
FIG. 1B illustrates a side view of an automobile utilizing a parallel hybrid power source according to the present invention.

As shown in FIG. 1, vehicular power system A is a parallel hybrid system which includes internal combustion engine 10 and EMG assembly B for powering automobile C. Both internal combustion engine 10 and EMG assembly B are coupled with powertrain assembly D for driving wheel assembly 16 of automobile C.

Figure 2:
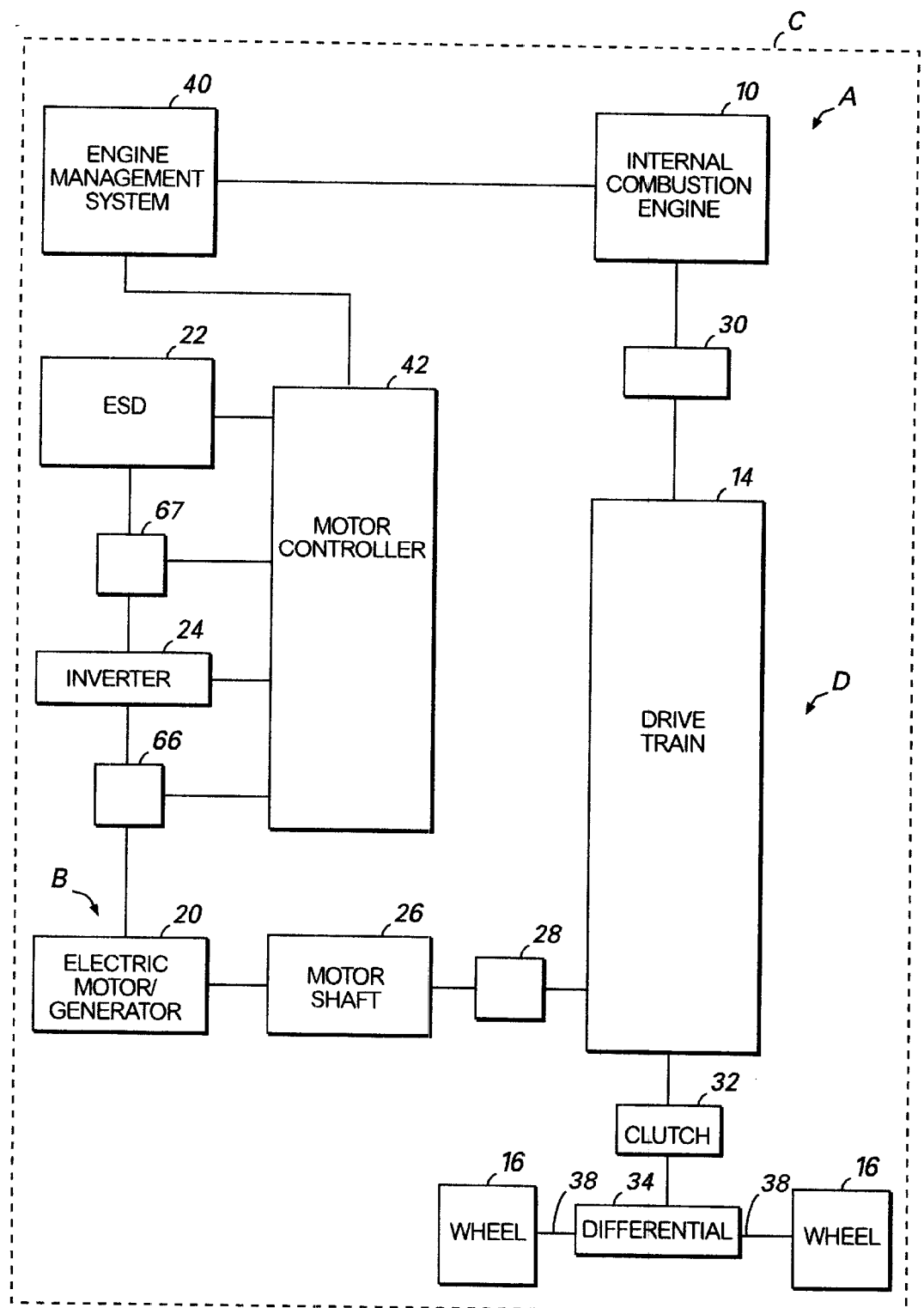
FIG. 2 is a schematic of a vehicular power system according to the present invention.

As shown in FIG. 2, EMG assembly B preferably includes electric motor/generator (EMG) 20 and inverter 24. EMG 20 in the presently preferred embodiment is a brushless DC magnet. EMG 20 is connected to an ESD 22 which in this illustrative embodiment is a 300 volt NIMH battery pack. ESD may be any type of energy storage device such as a flywheel. Inverter 24 supplies drive current to the EMG 20 when the EMG is in its drive mode. An output shaft 26 is rotated by EMG 20 and is coupled to a drive shaft 14 via a gear assembly 28. Powertrain assembly D also includes a crankshaft 30 which is rotated by the internal combustion engine 10. Powertrain assembly D further includes a differential 34 which provides torque to wheels 36 via an axle 38. Drive shaft is coupled to differential 34 via a clutch 32 for selective engagement. In the preferred embodiment, both EMG assembly B and internal combustion engine 10 may simultaneously provide torque to drive shaft 14 for operation of automobile C.

As further shown in FIG. 2, control system E controls the contribution of torque from internal combustion engine 10 and EMG assembly B to powertrain assembly D during operation of automobile C. Control system E includes an engine management system 40 and EMG controller 42. Both engine management system 40 and EMG controller 42 monitor a plurality of control parameters subsequently utilized for controlling the operation of EMG assembly B to provide appropriate torque to powertrain assembly D.

Engine management system 40 monitors and controls the operation of internal combustion engine 10. EMG assembly B includes EMG controller 42 and inverter 24. By continuously monitoring the operation of automobile C through engine management device 40 and EMG controller 42, EMG 20 may be controlled to provide additional torque via output shaft 26 to powertrain assembly D or to recharge ESD 22.

Figure 3:
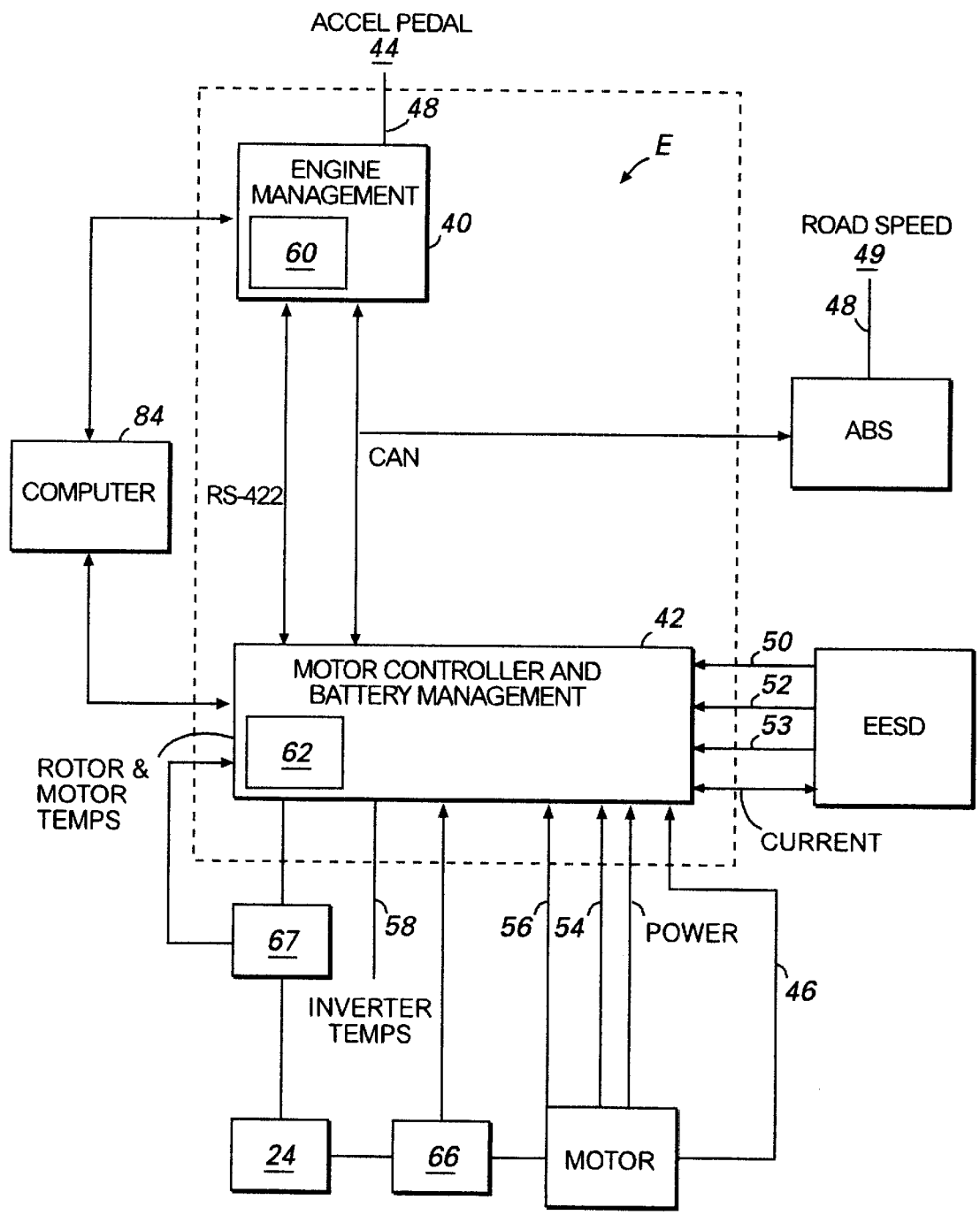
FIG. 3 illustrates the schematics of the electronic controller for operating the parallel hybrid automobile according to the present invention.

As shown in FIG. 3, engine management system 40 receives several signals for monitoring the operation of internal combustion engine 10. In the illustrated embodiment, a first signal is accelerator pedal signal 45 produced by accelerator pedal 44. Accelerator pedal 44 is any suitable electronic device which provides an accelerator pedal signal related to the position of the pedal. Engine management system 40 responds to the accelerator pedal signal 45 for controlling delivery of fuel to the fuel injection system (not shown). Additionally, engine management system 40 may receive a traction control signal 48 from traction control device 49 indicating if the tire traction is being maintained or if slippage is occurring. Slippage would indicate that the application of more torque to the tires would not be beneficial and would most likely result in the tires spinning.

EMG controller 42 receives several inputs relating to the operating environment of EMG assembly B. ESD 22 includes several modules or cells which operate at a predetermined voltage and temperature. In the preferred embodiment, ESD 22 is a battery which preferably includes ten modules each with twenty-six cells. The cells are nickel metal hydride. Signals indicating the temperature and voltage of each module, and gas pressure and temperature of selected cells is transmitted to EMG controller 42 as respective temperature signals 50, voltage signals 52 and gas pressure signal 53. These signals may be utilized by EMG controller 42 for controlling the operation of EMG 20.

In the presently preferred embodiment of the invention, EMG 20 is a permanent magnet EMG. The temperature of the windings within the EMG are monitored, and winding temperature signals 54 are sent from each winding to EMG controller 42. The position and temperature of the rotor are also monitored and a rotor position signal 56 and rotor temperature signal 59 are transmitted to EMG controller 42. Additionally, the revolutions per minute (rpm) of the motor's crank shaft is monitored for determining the motor's speed. An rpm signal 46 is transmitted to EMG controller 42.

Inverter 24 controls the flow of current from ESD 22 to the individual poles within EMG 20. In the preferred embodiment inverter 24 has two sets of three switching circuits which are controlled by a microprocessor for directing current to and from the respective poles of the EMG in a manner such that the poles are sequentially activated to provide motor force to the rotor. Because of the heat generated by the operation of the inverter, the temperature of the inverter is monitored, and an inverter temperature signal 58 is transmitted from inverter 24 to EMG controller 42. As shown in FIG. 3, traction control signal, road speed signal, and other engine management signals are communicated to EMG controller 42 via RS 422 line.

Several microprocessors are utilized for controlling the operation of vehicular power system A. Engine management system 40 includes an engine management microprocessor 60 which receives accelerator pedal signal 45, traction control signal 48 and rpm signal 46. EMG controller 42 includes an EMG control microprocessor 62 which receives the battery temperature signal 50, the battery voltage signal 52, the winding temperature signals 54, rotor position signal 56 and inverter temperature signal 58. EMG microprocessor 62 also controls the operation of inverter 24 for directing current to EMG 20 from ESD 22 when EMG 20 is determined to provide EMG assist to powertrain assembly D. EMG microprocessor 62 also controls the current supplied by the EMG when EMG 20 acts as a generator for regeneration of ESD 22. Ammeter 66 is located in series between inverter 24 and EMG 20 for monitoring the amperage provided between EMG 20 and ESD 22. Ammeter 66 provides a signal to the EMG controller 42 in order to provide feedback. ESD ammeter 67 is located in series between ESD 22 and inverter 24 and is utilized to determine the current charge status of ESD 22.

In operation, EMG 20 is utilized in two modes. In the first mode, herein referred to as EMG assist, current is supplied to EMG 20 by ESD 22 via inverter 24 for providing torque to drive shaft 14. The amount of magnitude and sequencing of pulses is controlled by inverter 24. In the second mode, herein referred to as regeneration, EMG 20 is utilized as a generator and charges ESD 22. The drive shaft 14 turns EMG 20 enabling EMG 20 to become a generator. The switches within inverter 24 are also switched to enable current to flow from EMG 20 to ESD 22.

As shown in FIG. 4, the amount of EMG assist or battery regeneration required is determined by a demand map 72. Demand map 72 is generated by the designer of the automobile, and programmed into the engine management system 40 through the use of computer 84 (shown in FIG. 3). While the preferred embodiment uses an external computer to program or code demand maps 72, other embodiments might include a permanent programming screen within the vehicle; detachable internal or external terminals; or even simply a keypad. Demand maps would not normally be programmable by final end-user driver's of commercially produced embodiments of this invention; however, depending on application, some embodiments could include the ability for the final end-user to program or alter preconfigured demand maps. These demand maps are stored as arrays of data in engine management system 40. A pointer within engine management system 40 designates which of the one or more demand maps stored in engine management system 40 is currently active.

Demand map 72 is used to determine the appropriate action of the EMG based on the position of the accelerator pedal and the current rpm of the motor. The values in the demand map are pre-determined in order to maximize specific performance characteristics of the vehicle. By utilizing different maps, the driver may optimize fuel consumption, pollutant expulsion, and/or acceleration. EMG system 40 may switch between demand maps upon the triggering of several conditions. Triggering or selecting may occur manually when the driver signals, through hard devices such as push buttons or knobs or through soft devices such as an onboard terminal or computer, a change in performance needs. For instance, a driver may have a performance demand map in place for country highway driving then, upon entering a high ozone city, manually initiate a pollution control map. Additionally, a governing demand map may be utilized to limit the top speed of the vehicle.

Figure 29:
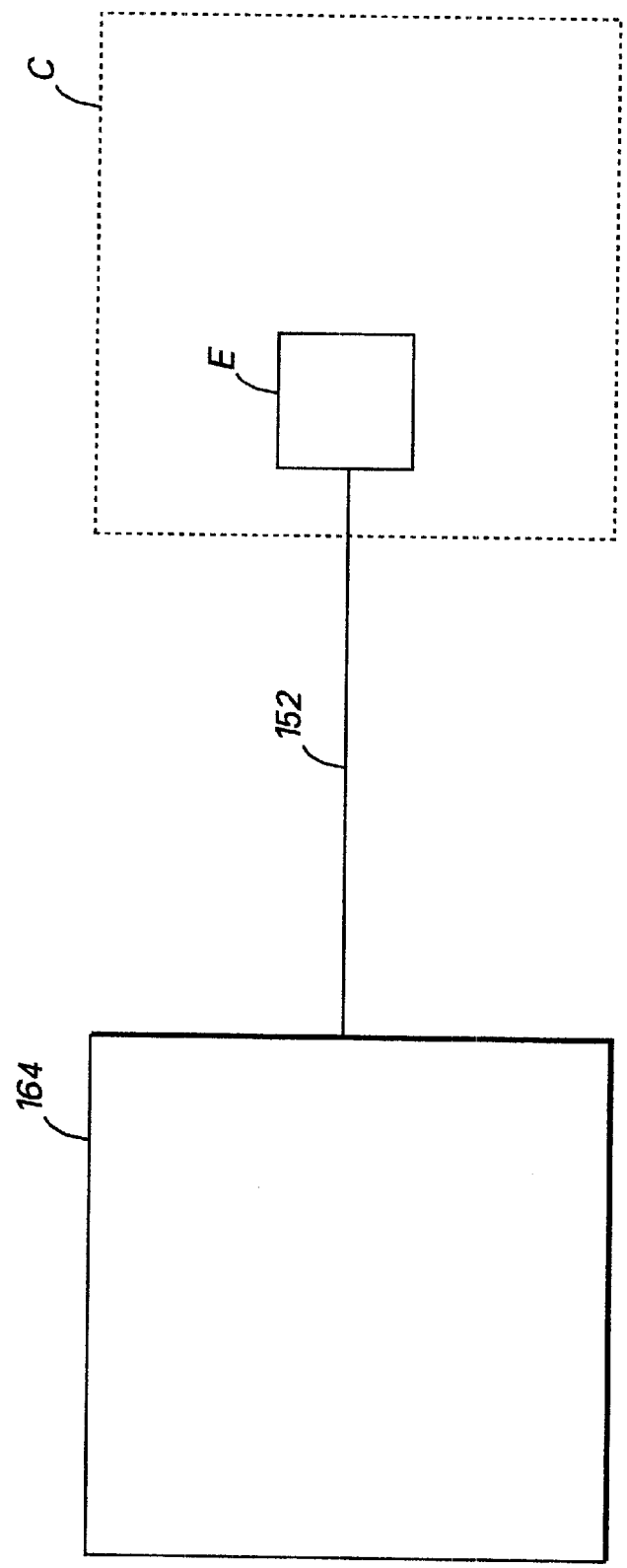
FIG. 29 illustrates a control system for operating a hybrid vehicle according to the present invention receiving a remote signal for controlling the operation of a control system.

Control system B incorporates these parameters for manipulating the operation of vehicular power system A. The demand table and the various control parameters may be manipulated by a remote computer such that engine management microprocessor or EMG controller microprocessor may be remotely controlled. For instance, as illustrated in FIG. 29, remote signal source 152 may be provided by transmitter 164 designating a no emissions zone. Consequently, remote signal 152 may be set at a frequency which when received by control system B will induce microprocessor engine management 60 to shut off internal combustion engine 20 and prevent fuel from being presented to engine 20. Also, a supplemental demand map 166 can be utilized to control the delivery of torque by EMG 20 to power the vehicle C. Alternatively, the engine 20 may be controlled to operate at a constant value of rpm which provides maximum fuel efficient and/or minimum emissions and additional torque can be provided as needed to the drive wheel by the electric motor.

Also, in an additional embodiment, a floppy drive enabling either the operator to directly manipulate the operating parameters of control system B or to insert an electronic medium such as a floppy disk having preset operating characteristics may be present. In this situation, an automobile manufacturer may provide separate profiles containing separate parameters for demand table 72 and relating operational characteristics which enable control system B to operate in variable modes wherein the modes may vary from city driving, country driving, winter driving, slippery conditions, out of gas conditions, and mountainous conditions.

Various examples of vehicular power system A may be utilized. For instance, if the objective of vehicle power assembly A is to maximize the fuel efficiency of vehicle A, then EMG generator 20 will only regenerate ESD 22 when vehicle A is braking. By only engaging EMG generator 20 as a generator between braking of vehicle A, no excessive loads are placed on the drive train during normal operation of vehicle A but a load is placed on the drive train only when braking. Accordingly, a signal from the braking system such as an ABS signal 180 may be utilized to indicate that regeneration is to be applied and if no ABS signal is present then regeneration of the battery would not be applied. Accordingly, in operation, the EMG controller microprocessor would receive the signal from the ABS braking system indicating that braking was occurring. Consequently, a demand map may exist in the fuel efficiency mode having different amounts of regeneration depending on the rpm and the throttle position of the vehicle, but regeneration would only be applied if an ABS signal is present. Furthermore, in a combined embodiment, the driver may have a control switch which he may activate for instructing vehicle control system A whether to only regen during ABS braking or to regenerate at all times. For instance, in a race situation, if the driver and his vehicle was sufficiently positioned in the race, the driver may have the regeneration mode operated at all times according to the demand map when EMG assist was not being applied. However, if the driver desired to enter into a fuel efficiency mode either due to a fuel constraints or position of the race, the driver may activate the control switch for indicating that regeneration was only to be applied during ABS braking.

Figure 30:
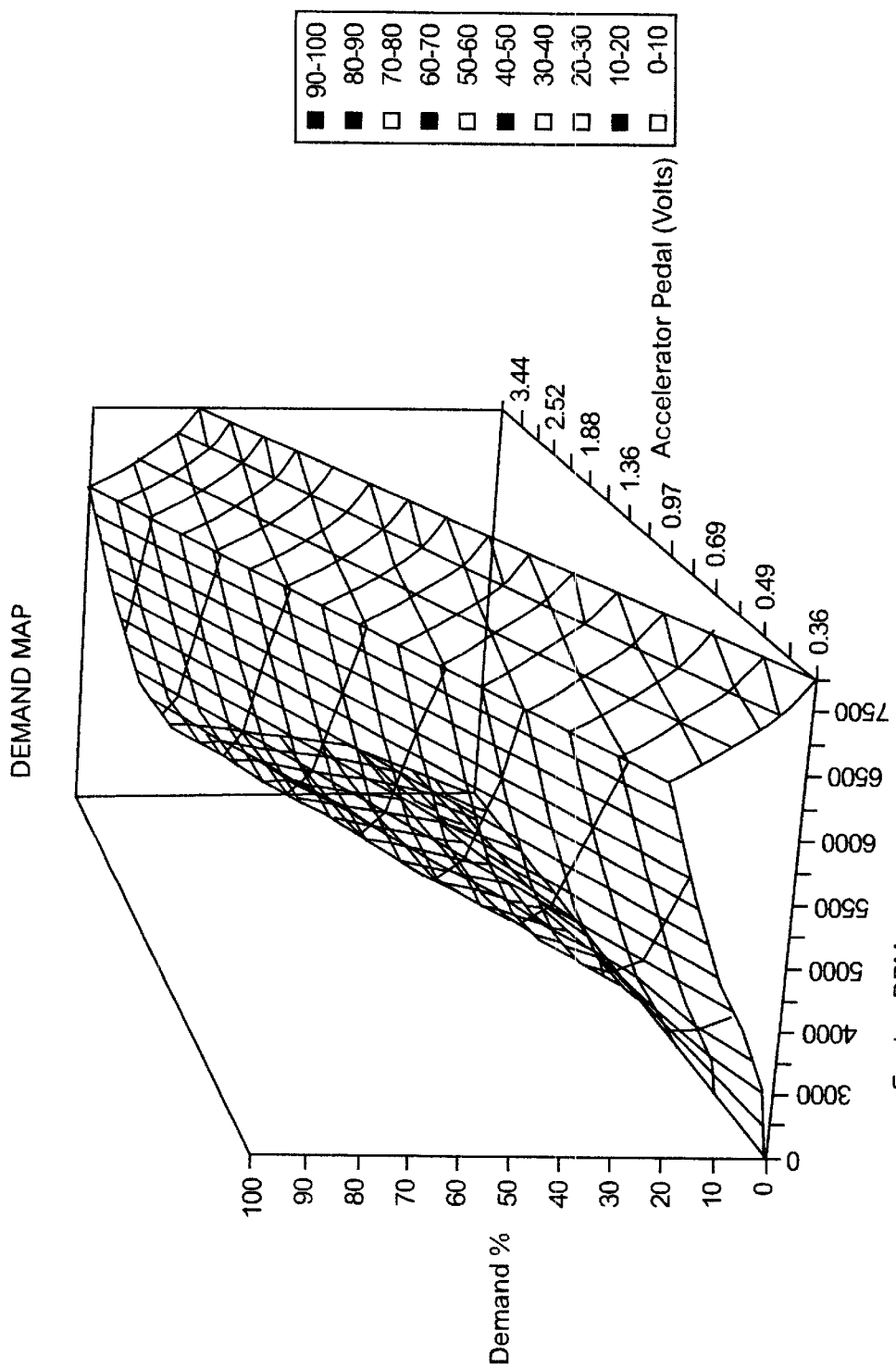
FIG. 30 illustrates a supplemental demand map according to the present invention.

Also, if regeneration was only to be achieved during braking, a completely separate demand map as shown in FIG. 30 may be provided than if regeneration of the battery was incurred when not in the EMG assist mode. These separate demand map would be configured to take into account that the battery was being regenerated at a less frequency to enable suitable recharging of the batteries.

Additionally, in another embodiment, vehicle C may be a domestic vehicle which may be used in normal driving, but also utilized in a zero emission zone. In this embodiment, two distinct demand maps may exist. The first demand map would take into account that the internal combustion engine is the primary source of power and the EMG is the secondary source of power. Accordingly, the EMG would only be utilized for assistance to the internal combustion engine for acceleration. However, in a zero emission zone, the internal combustion engine would not be utilized and the EMG would be the sole source of power. Consequently, the EMG assist demand map configuration may not be suitable when EMG 20 is acting as the sole source of power. Accordingly, a second demand map would exist which would increase the voltages supplied from the battery to the EMG so that the EMG may provide sufficient torque to power the car solely on its own. To activate between operation of the different demand maps, a signal may be activated by the driver for distinguishing the second modes, or a signal may be received over the air waves from a remote transmitter. Furthermore, when the vehicle is in an non-emission zone and solely operating by the EMG, a regeneration map which would regenerate the EMG when the EMG was not operating in EMG assist would be suitable. Consequently, by engaging the EMG in an EMG mode only, a second signal would trigger that a separate regeneration map would need to be utilized which is similar to regeneration of the battery only when braking. Consequently, it may be seen that different demand maps for the battery may be utilized depending on the operating conditions.

In another illustrative embodiment, vehicle C may be operated with a lean fuel mixture. Such a mixture may be utilized to enhance fuel efficiency. A situation may arise in a EMG assist mode, the additional torque generated by EMG 20 would result in stalling of the vehicle. Accordingly, a separate demand map would be utilized limiting the amount of additional torque provided by EMG 20 in a EMG assist mode reflecting the lean fuel operational environment.

Another illustrative embodiment of the use of vehicle power system A is that which may occur in a racing environment. In a racing environment, the primary objective is to maximize speed. Accordingly, vehicle power system A may be configured such that EMG assist will be provided to enhance the torque application of an internal combustion engine. For instance, during the course of a race, additional torque is generally only required during acceleration in straight-a-ways. When the automobiles negotiate turns, generally the internal combustion engine is sufficient and provides more than enough torque to enable an operator to negotiate the turn. However, the situation exists that if additional torque is applied by the EMG at inopportune times, the additional application of torque by the EMG may merely only result in the tires of automobile C spinning because the additional torque is more than their tires can handle. This could occur if the automobile is not traveling at sufficient road speeds. Consequently, it would be an objective to apply as much torque as possible by the EMG to assist the internal combustion engine in driving the drive train but fully providing the maximum additional torque such that the tires will not spin. The spinning of the tires would merely result in the wasting of stored battery energy and creates a hazardous driving environment. Accordingly, a demand table would be created such that the EMG assist control parameter controls the EMG to provide as much additional torque as it can within the operating boundaries without creating the tires to spin. Additionally, in such an embodiment, internal combustion engine 10 may be operated near maximum operation at all times even though the additional work provided to the drive train is unnecessary, this energy may be stored in the ESD for subsequent use during acceleration. In this manner, the automobile is able to operate with a predetermined sized engine but achieve more horse power than would normally would be had by such a sized engine due to the additional torque provide by the electric motor. In this embodiment, ESD stores the energy from the internal combustion engine. Such an embodiment will enable the automobile to be more competitive by having a smaller engine and hence less weight while still being able to have more horsepower than normally would be had by such an engine.

Additionally, while the EMG will be controlled to provide maximum torque to supplement the torque of the internal combustion engine, it is necessary to provide additional safety parameters to ensure that the EMG does not burn itself out or that the associated ESD does not become depleted. Since the operator has limited control over the EMG, internal control parameters are required. In a racing situation, these control parameters may include the temperature of the EMG, inverter and battery for insuring that the integrity of the system may be maintained. Additional limiting parameters may be a traction control parameter to assist in determining that if additional torque is to be applied by EMG assist that such additional torque would not be beneficial and hence limit the application of the additional torque by the EMG during EMG assist. Consequently, the optimization of EMG assist by EMG may be had by providing a demand table which enables the EMG to provide maximum torque as required by the system without the operator being concerned that the application is maximum due to the over sight of the limiting parameters. For instance, typically during the operation of a vehicle, the operator utilizes gauges having red line indicators indicating a safe and unsafe zone of operation of the vehicle. By providing limiting parameters, the EMG may operate in either red line level with limited risks that such operation may result in system malfunction.

Additionally, with the excitation of EMG assembly 20 to power vehicle A, ESD 22 will eventually become fully discharged. Accordingly, to prevent the ESD from being filly discharged and hence making EMG 20 inoperable, ESD is regenerated when EMG 20 is not in EMG assist mode. The regeneration variable may vary depending on the throttle position and the rpm of the automobile. The ESD is regenerated by EMG 20 functioning as a generator providing varying amounts of current for recharging a battery. Inverter 24 controls the delivery of current to ESD 22. The varying amounts of current supplied to the ESD over different rpms and throttle positions is reflective of the excess torque available from the drive train when powered by the internal combustion engine. Since when EMG generator 20 acts as a generator, a load is placed onto the drive train, it is desired that minimum load be placed on the drive train thus not hindering the speed of the automobile while still providing torque to the EMG shaft in order for EMG generator 20 to function as a generator. By manipulating the demand variables in consideration of the torque map of internal combustion engine, the ESD may be regenerated optimally by providing larger amounts of current when the drive train system may provide the excess torque. Additionally, to prevent the battery from being overcharged, battery parameters such as cell voltage, intra cell voltages, battery temperature, and cell pressures, are constantly monitored to prevent the battery from overcharging or becoming unstable. All of this function is transparent to the driver of the vehicle thus enabling the driver to focus his attention onto the race course without having to worry about the condition of the EMG assembly and the battery.

Figure 5:
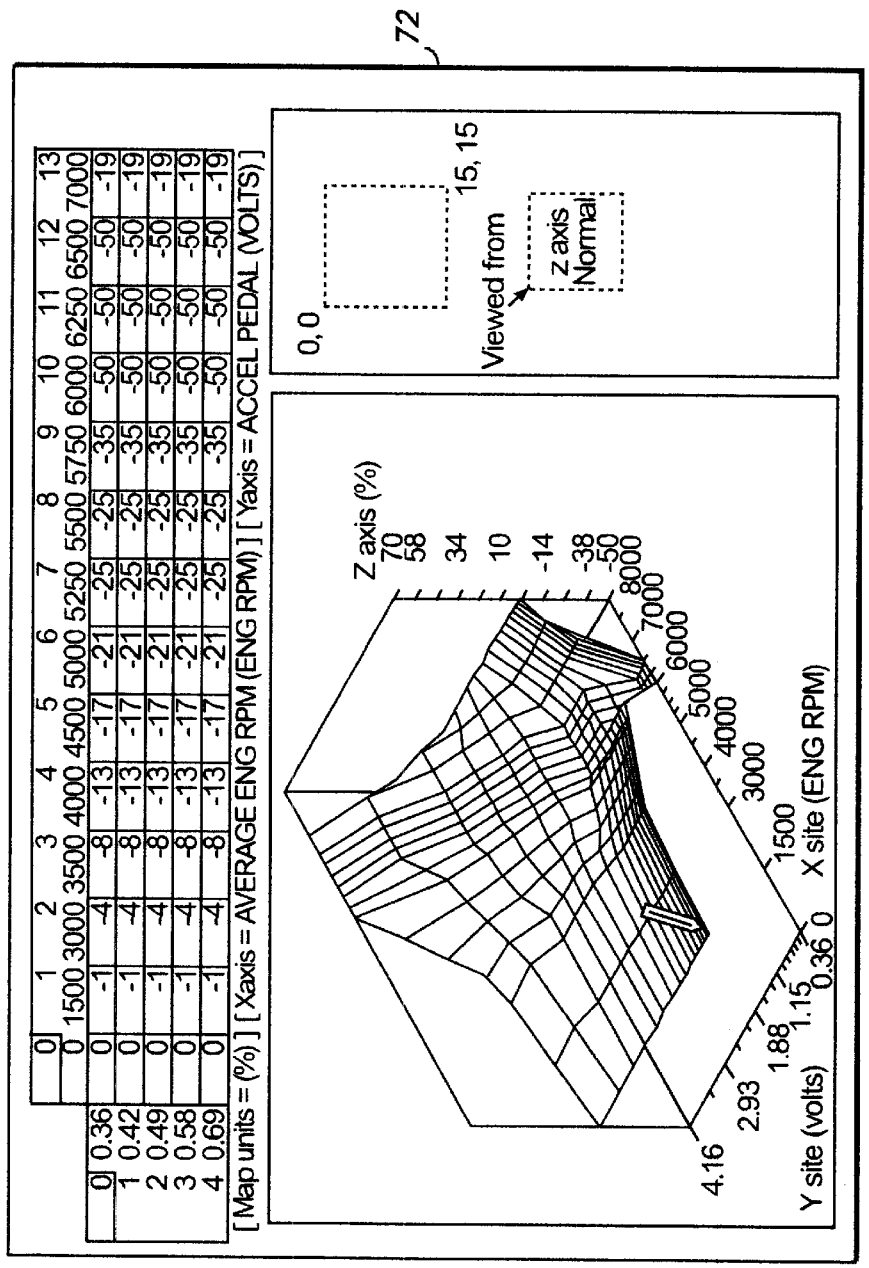
FIG. 5 illustrates a demand map according to the present invention.

Returning to the demand maps, as shown in FIGS. 4 and 5, demand map 72 is a three dimensional array. The x axis represents revolutions per minute of the engine as an independent variable. In the preferred embodiment, there are fifteen data points for selected rpm values ranging from zero to eight thousand rpm. The y axis represents accelerator pedal position as an independent variable. In the preferred embodiment, there may be fifteen accelerator positions in the array. These range from zero to five volts as measured by accelerator pedal 44. The z axis denotes a corresponding variable dependent on accelerator pedal position and rpm of the engine which is the percentage of the maximum current available from or to the ESD 22. In the table shown on FIG. 3, negative numbers are utilized to indicate that the EMG is required to function as a generator supplying that much recharging current to the ESD 22. The positive numbers reflect the current to be applied when EMG 20 is acting in the EMG assist mode.

While the vehicle is operated, sensors monitor the position of the accelerator and the rpm of the engine. For example, a "racing" map may be designed in such a manner that the EMG assists the fuel injected engine by providing additional torque when the engine will not meet the driver's needs. Typically torque provided by an internal combustion engine is not constant over the rpm range and may be represented on a torque curve plotting rpm versus torque which shows the peaks and valleys of the engine performance. By use of a "racing map" EMG may be used to provide additional torque at high rpm values where the engine performance begins to subside as well as fill in the gaps at other places where the output of the engine is less than optimal. The contribution of the EMG in a racing setting may be broken into four main sections: (1) starting the engine (2) starting from a stop; (3) acceleration; (4) cruising at constant speed; and (5) coasting or braking.

Figure 6:
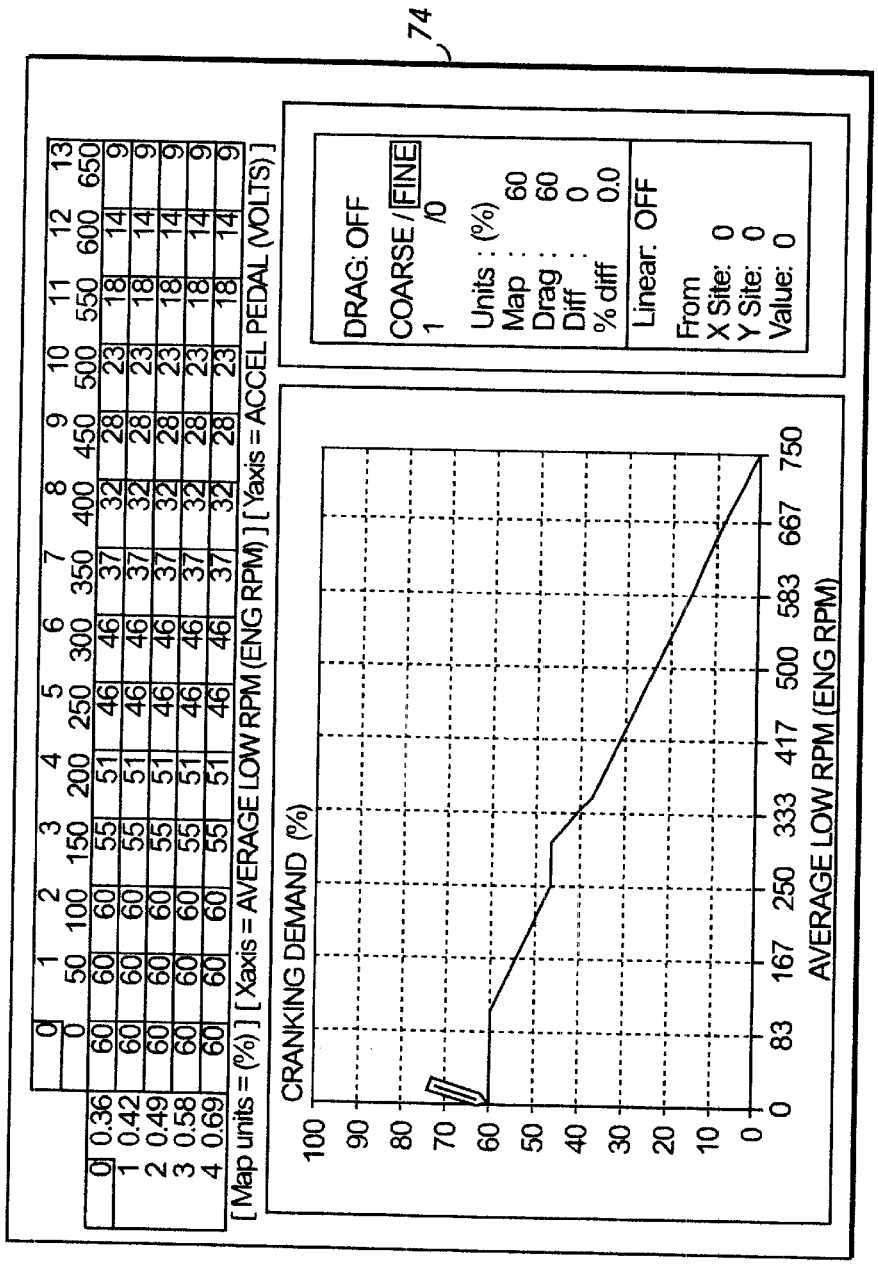
FIG. 6 illustrates a cranking demand map according to the present invention.

The EMG is initially used for starting the engine. The currently preferred embodiment provides a separate demand map for engine starting. This is a cranking demand map 74 and is illustrated in FIG. 6. This map does not take throttle position into account and only operates on the engine rpm. When the starting function is initiated, the EMG provides a very large torque in order to overcome the large load of the stationary engine. As the engine rpm increases, the EMG decreases its contribution. When the engine reaches its idling speed, the EMG contribution ceases.

Figure 7:
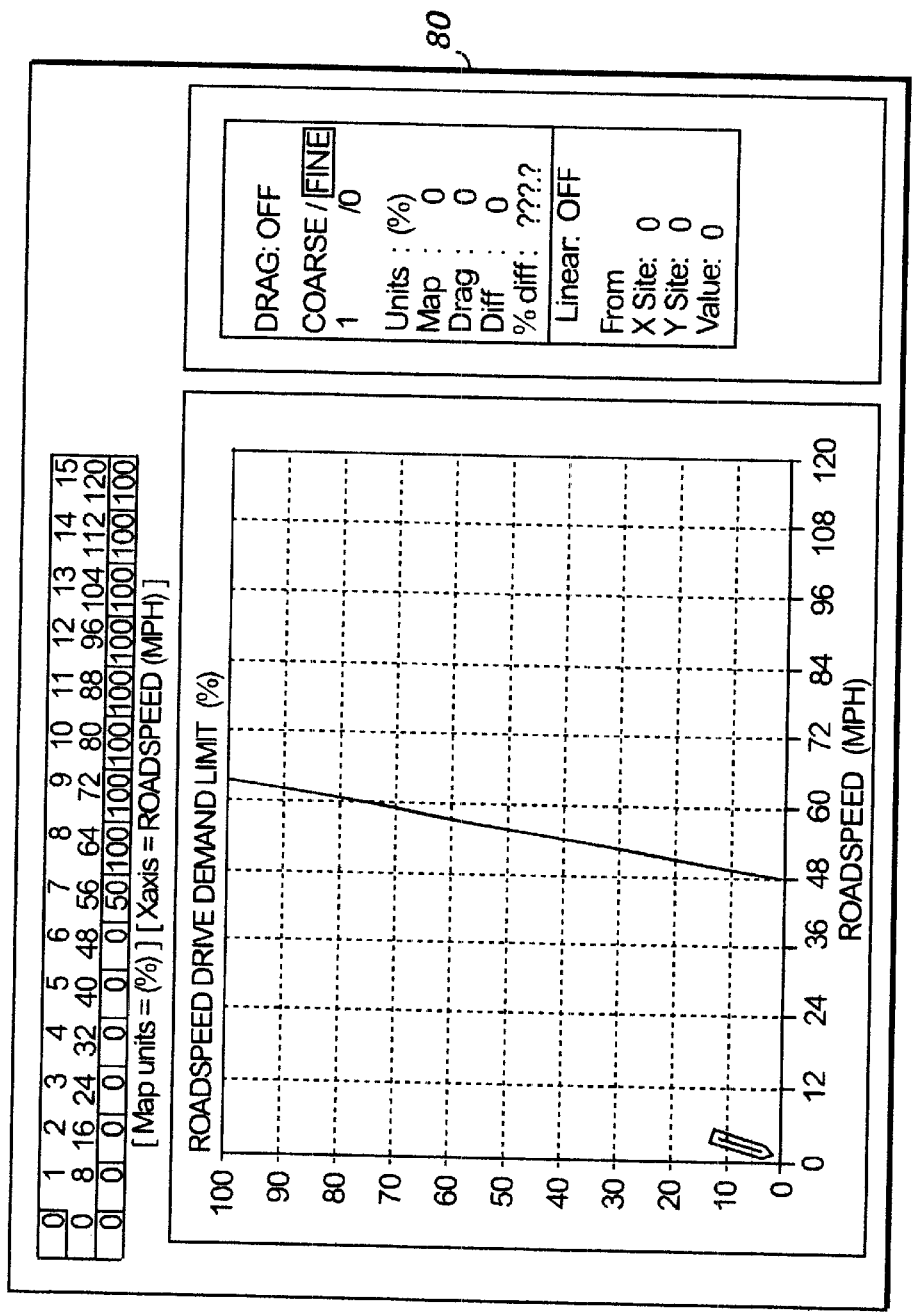
FIG. 7 illustrates a road speed limiting map according to the present invention.

When the car initially starts from a stop, the EMG does not provide any contribution. This is due to the interaction of the road speed limiting map. Road speed limiting map is illustrated in FIG. 7. This map prevents the EMG from contributing additional torque at low speeds. This is done because a large torque contribution at low speed can cause reduced traction and make the vehicle more difficult to drive. The EMG is prevented from contributing until the speed of the vehicle reaches a level where the tires could hold the additional torque.

In the racing configuration, the EMG is most often utilized during acceleration. The EMG is engaged to provide additional torque when the accelerator is pressed to levels determined to represent the driver demand for more power. The amount of assistance is increased as the rpm of the engine increases because the engine is not able to provide sufficient torque at high levels.

When the vehicle is coasting or braking, the throttle and rpm readings are generally in a range that corresponds with the battery regeneration mode. As can be seen in the demand map, varying levels of battery regeneration are used depending on the amount of additional load the drive shaft can handle. At high rpm, the engine and drive shaft have substantial momentum and a large additional load can be placed on the drive shaft to regenerate the battery.

EMG assist is implemented by using the EMG to generate additional torque to supplement the output of the engine. After the required torque is read from the demand map, the hardware manipulates the inverter switches to excite the EMG. The hardware must implement a series of actions to excite each phase of the EMG in sequence.

Figure 8:
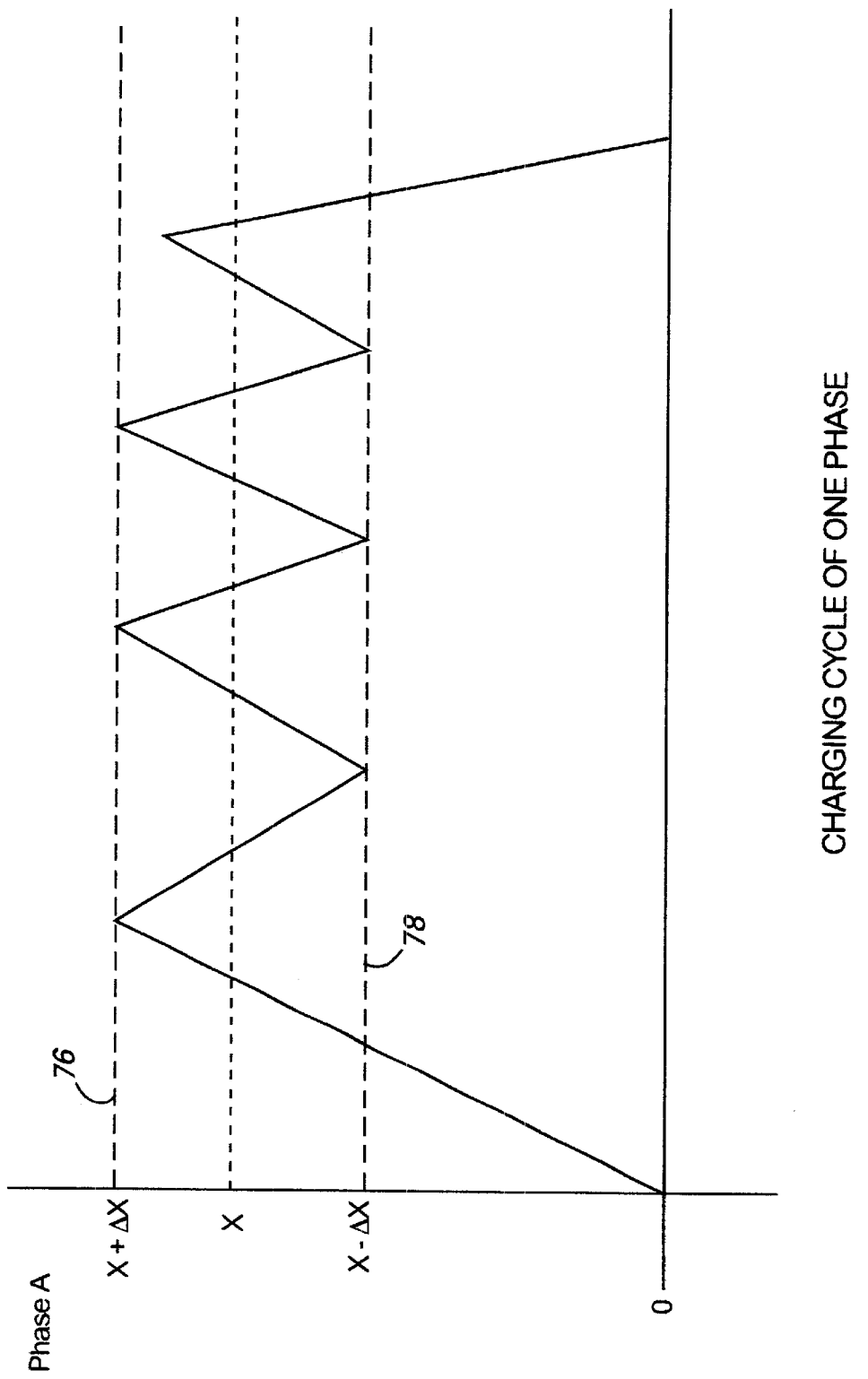
FIG. 8 illustrates hysteresis control according to the present invention.

FIG. 8 illustrates hysteresis control as implemented by inverter 24 to control the flow of current from ESD 22 to EMG 20. Hysteresis control consists of establishing a hysteresis band level. The hysteresis band level consist of an upper hysteresis band limit 76 and a lower hysteresis band limit 78. The upper and lower bands allow fluctuation in the torque where the EMG is active. In order to achieve the ideal result of producing a nearly constant torque level, the current will be required to be switched on and off very rapidly. While this would produce the desired torque, it would result in the switches becoming overheated.

Accordingly, in order to accommodate the limitations of the inverter in manipulating the various switches, control system B implements an algorithm by which the hysteresis band is manipulated. When it is desired that the EMG is to act in a EMG assist mode, the corresponding battery voltage percentages read from demand table 72 are utilized by inverter microprocessor for controlling inverter 24 in providing the appropriate current to the EMG. The current data point read from demand table 72 is the optimum preferred current level. Accordingly, the hysteresis band upper limit is set at a predetermined point above the desired current value and the hysteresis lower limit point is set at a predetermined level below the desired point. Accordingly, in operation, current is allowed to flow from ESD 22 to EMG 20 by inverter 24 and the current is measured by ammeter 66, which feeds a digital representation of current to the microprocessor, until the current reaches the upper hysteresis band limit. The inverter then controls the presentation of current from the ESD to the EMG until the current reaches the lower hysteresis band limit. At this time, the inverter then controls the application of the current until it reaches the higher current hysteresis band level. This fluctuation is maintained throughout the EMG hysteresis process. Additionally, the intervals between the high and low hysteresis limits may be reduced for predetermined minimum band width while the temperature of the switching means is monitored to ensure that the inverter does not over heat. If the inverter enters an over heat state, the demand current is limited and reduced a predetermined amount depending on a reduction parameter. Due to this algorithm, torque is maintained near the optimal constant level through a EMG operation.

As the EMG reaches high speed, an advancing technique may be used in order to maximize the efficiency of the EMG. Advancing is a method of charging the next pole before the rotor reaches the point in its rotation where that pole would ordinarily start to pull. This enables the pole to reach its fully charged state by the time that the rotor is in position to be pulled by that particular pole. To utilize the advancing technique, rotor position signal 56 is utilized to identify the position of the rotor with respect to the stator.

In the second mode, EMG 20 acts as a generator for recharging ESD 22. ESD regeneration is implemented by utilizing the EMG as an induction machine. The EMG is coupled to the crankshaft of the engine so that it is rotating at a rate equal to that of the engine even when the windings of the EMG are not being energized by the ESD. When the EMG rotates in the manner, an electrical charge builds up on the windings. This charge is then directed to the ESD through the inverter in order to recharge the battery. The rate at which the ESD is regenerated may be varied as determined by the demand map. A higher rate of regeneration puts a greater load on the engine and drive train.

Both the additional torque contributions and the ESD regeneration are fully adjustable to meet the needs of various driving conditions. Through the use of different demand maps, a driver's preferred performance characteristics may be realized.

As illustrated by FIG. 3, regeneration is applied to the ESD 22 in varying degrees. More current is applied at higher rpms and lower throttle positions indicating that the drive train has sufficient torque to drive the automobile and also drive output shaft 28 of EMG 20 enabling EMG 20 to act as a generator. Inverter 24 through its switches also manipulates the amount of current flowing from the EMG 20 to ESD 22. Hysteresis control is also utilized for controlling the amount of currents applied to ESD 22.

Figure 9:
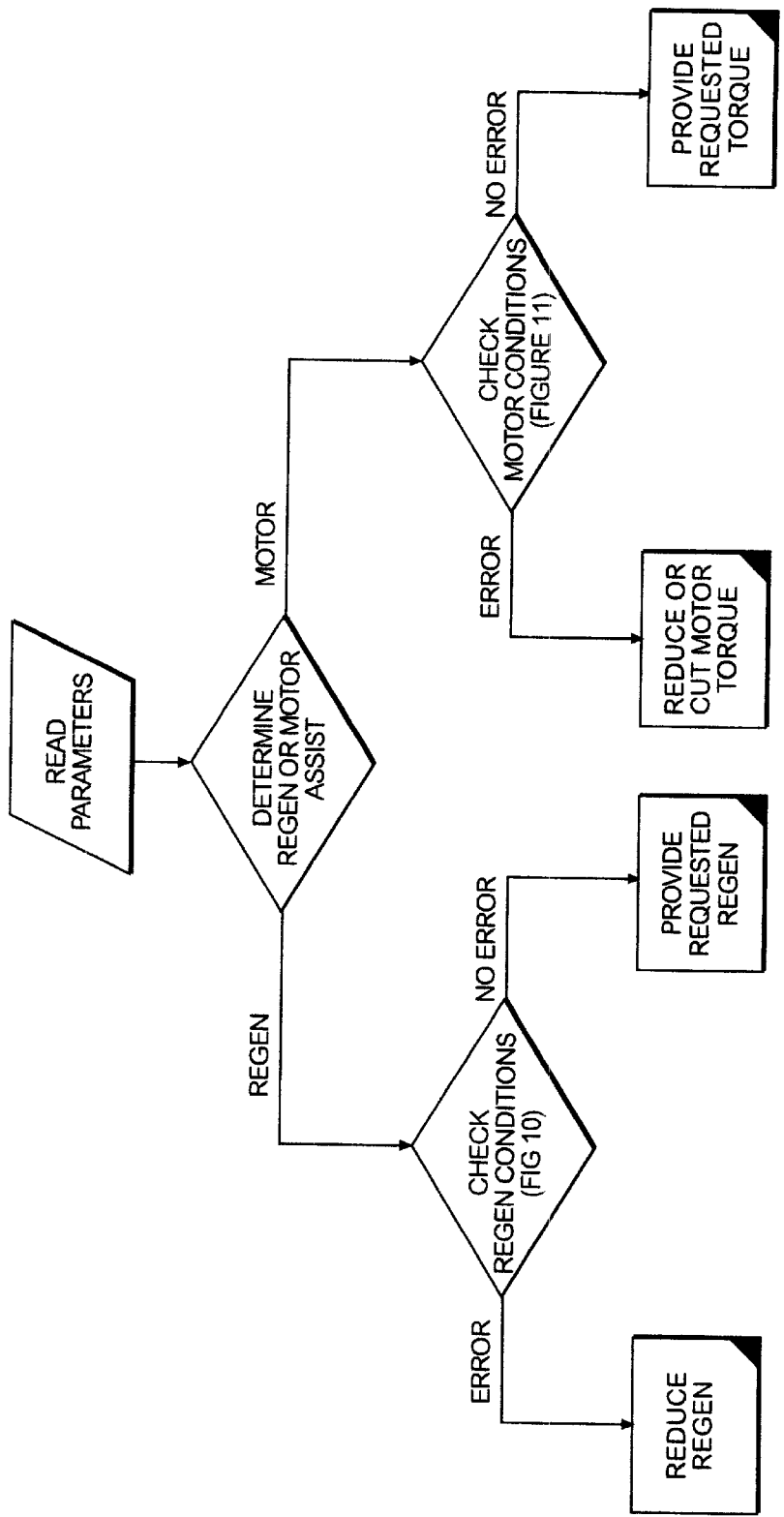
FIG. 9 is a flow chart illustrating the decision-making and operations for the parallel hybrid control system according to the present invention.

FIG. 9 illustrates the operation of the vehicle power system A. Initially, the throttle pedal position and rpm values are read by throttle pedal position sensor and rpm sensor. If the engine is being cranked, then the main torque demand is calculated from the cranking demand map. If the engine is not being cranked, then the main demand is received from the main demand map. Depending on the rpm and throttle position, the demand value may either be for regeneration or motor assist. Prior to entering into the EMG assist or regeneration stage, certain parameters of the internal combustion engine are monitored to ascertain if additional torque should actually be applied to the wheels or if regeneration should occur.

However, prior to applying the demand values as read from the demand table, additional limiting adjustments must be considered. FIG. 10 illustrates some limiting parameters relating to motor assist according to one embodiment. These limiting adjustments include limiting parameters which prevent full EMG demand from being applied. The limitation of full EMG demand occurs to prevent vehicular power system A from operating beyond desired functional criteria. For instance, one attribute for limiting the demand is the maximum road speed as indicated by road speed map 80. If the desired road speed for that particular torque level has not been reached, then additional torque would merely result in the wheels spinning. This would produce an unstable operational environment and be a waste of resource. Accordingly, road speed maximum parameters may be utilized for reducing the demand.

Additionally, demand may be reduced if an overtemperature condition exists in either the EMG winding, the inverter or motor rotor. Monitoring of the temperature in the EMG windings and inverter is critical to prevent the system from burning itself out. One way in which to monitor the respective temperatures includes setting a high temperature limit and a low safe limit. If a high temperature condition occurs, the amount of demand is reduced until a low safe temperature is subsequently monitored. In another situation, the overall main demand as read from demand map 72 is reduced by a certain percentage in order to maintain vehicular power system A in a functioning state.

If any of these limiting conditions exist, then the demand level as originally retrieved from the demand table is modified by the limiting factors and subsequently utilized by the inverter for applying that current to the EMG. In order to enable the EMG to be excited at the current engine speed, the various positions of the rotators are monitored to enable proper activation of the respective winding. The torque is then increased in increments until the desired torque level is reached. In the event that the demand as calculated from the demand map is less than the prior level, then that amount of torque is applied immediately.

If the demand table indicates that the regeneration of the ESD is required, then inverter 24 controls the regeneration of the ESD at the current level percentage as defined in the demand table. However, to prevent overcharging of the ESD, certain regeneration limiting parameters are monitored. FIG. 11 illustrates some limiting parameters for regeneration according to one embodiment of the invention. Initially, all inverter switches are monitored and if any switch temperature is greater than the predetermined limit, then the regeneration is not permitted until all switches are below the predetermined temperature limit. Additionally, if any battery module voltage has a voltage when compared to another module greater than a predetermined voltage differential limit, then regeneration is not allowed until the module voltages between each respective module is within the predefined voltage difference. Additionally, if any module voltage in particular is above a predetermined module voltage limit, then regeneration is discontinued until all modules have a voltage greater than the minimum module voltage level. Another limit is that if any cell is venting gas, as measured by the maximum cell pressure, then regeneration is disallowed. If no demand limiting parameter exists, then regeneration utilizing the current from the demand map will be utilized for charging the batteries.

In the preferred embodiment, the engine rpm and throttle position are monitored every ten milliseconds for determining if EMG 20 is to be utilized as EMG assist or regeneration. Also, the limiting variables are monitored every ten milliseconds for determining the operation of the limiting features. In the event that the limiting parameters indicate that neither EMG assist or regeneration is to occur, then EMG 20 free wheels with drive shaft 14. This occurs by inverter 24 not allowing any current 20 flow between ESD 22 and EMG 20.

FIGS. 12 through 28 illustrate graphical user interface F which is utilized in conjunction with Control System E for manipulating the operation of EMG 20. Graphical user interface F is generally operated by a computer 84 enabling an operator to input a plurality of system control parameters into the operational software. The operational software is stored within memory for cooperation with engine management system 40 and EMG controller 42 for controlling the operation of EMG 20.

Figure 12:
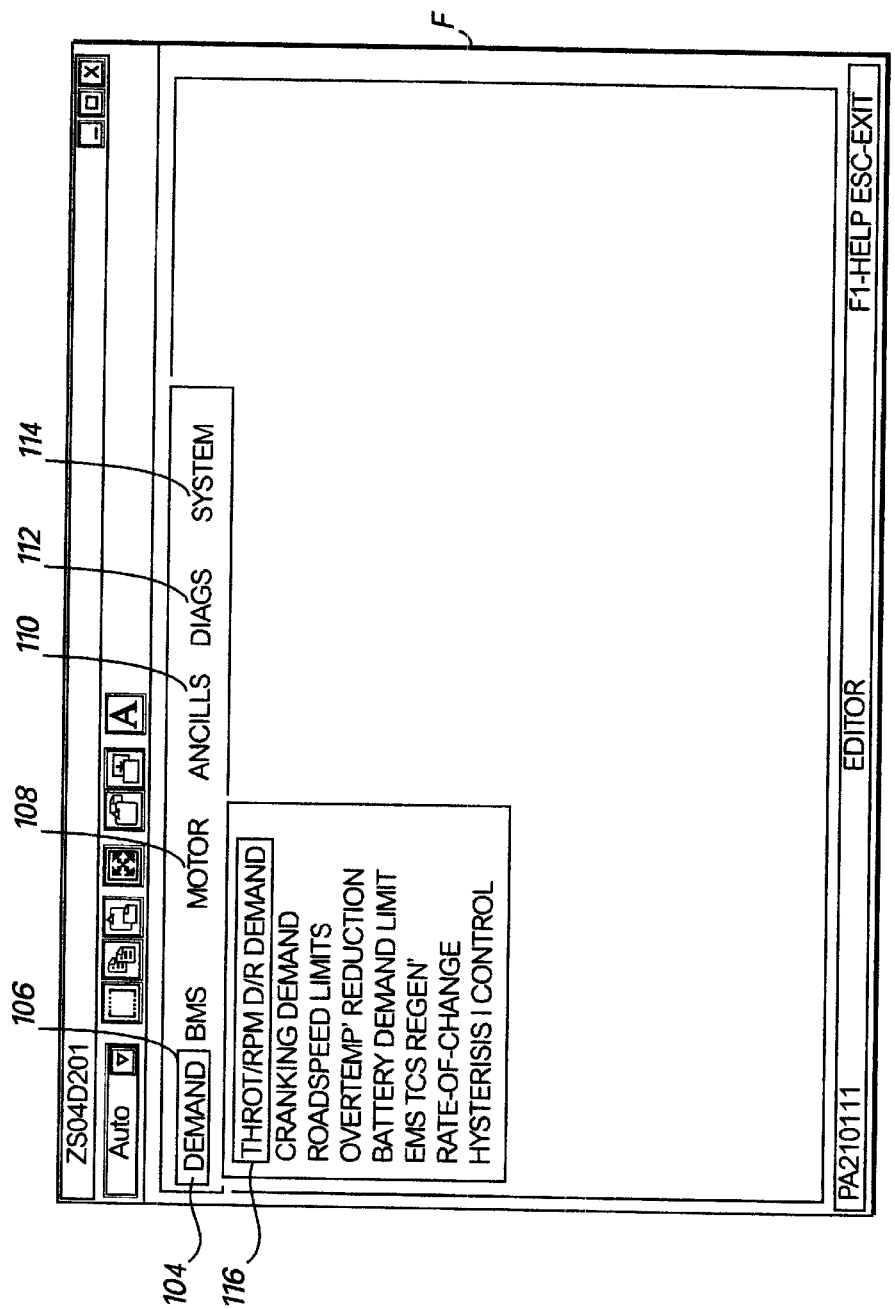
FIG. 12 illustrates a graphical user interface according to the present invention and the related demand screen for controlling the operation of a parallel hybrid vehicle according to the present invention.

As illustrated in FIG. 12, graphical user interface F includes a primary menu 102 which contain primary control categories relating to demand 104 which relates to determining EMG assist and regeneration, battery management system category 106 which includes defining attributes related to the battery management system; EMG category 108 which contains parameters relating to the EMG; ancillary category 110; diagnostic category 112 which contains diagnostic parameters and system category 114 which enable system parameters to be defined.

Figure 24:
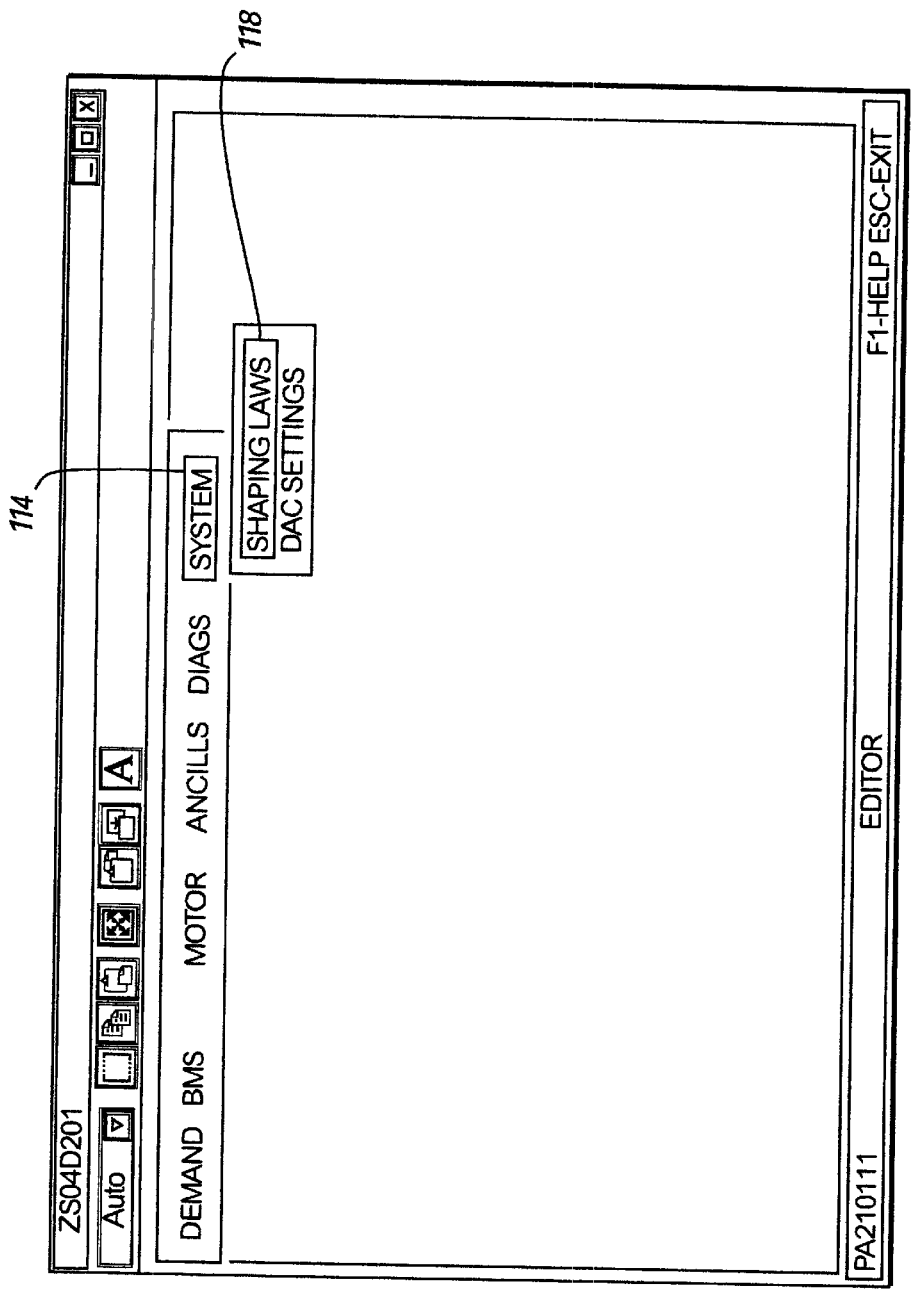
FIG. 24 illustrates the system parameters as utilized by the present invention.
Figure 25:
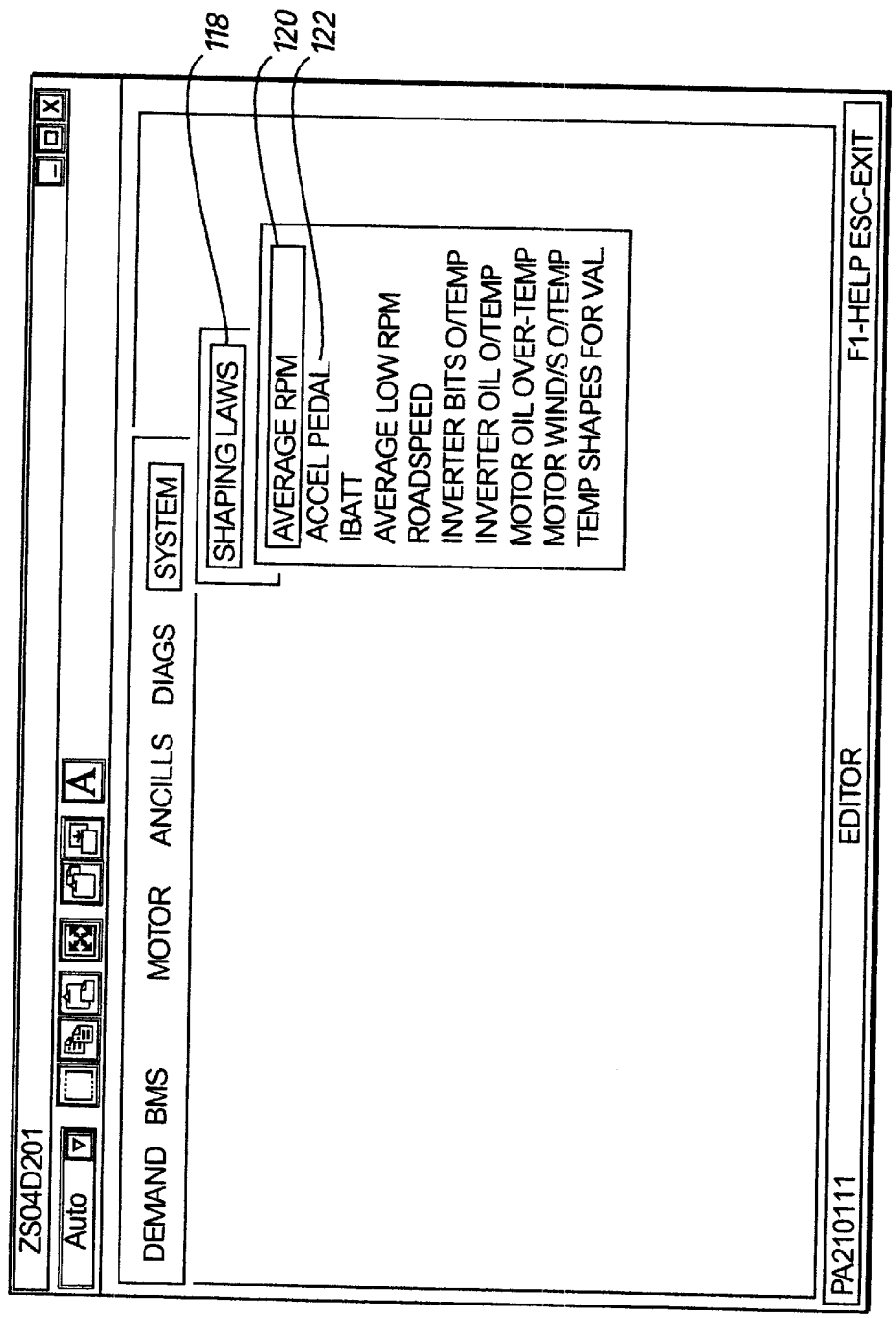
FIG. 25 illustrates the shaping law category for defining operational and limiting parameters as utilized by the present invention.
Figure 26:
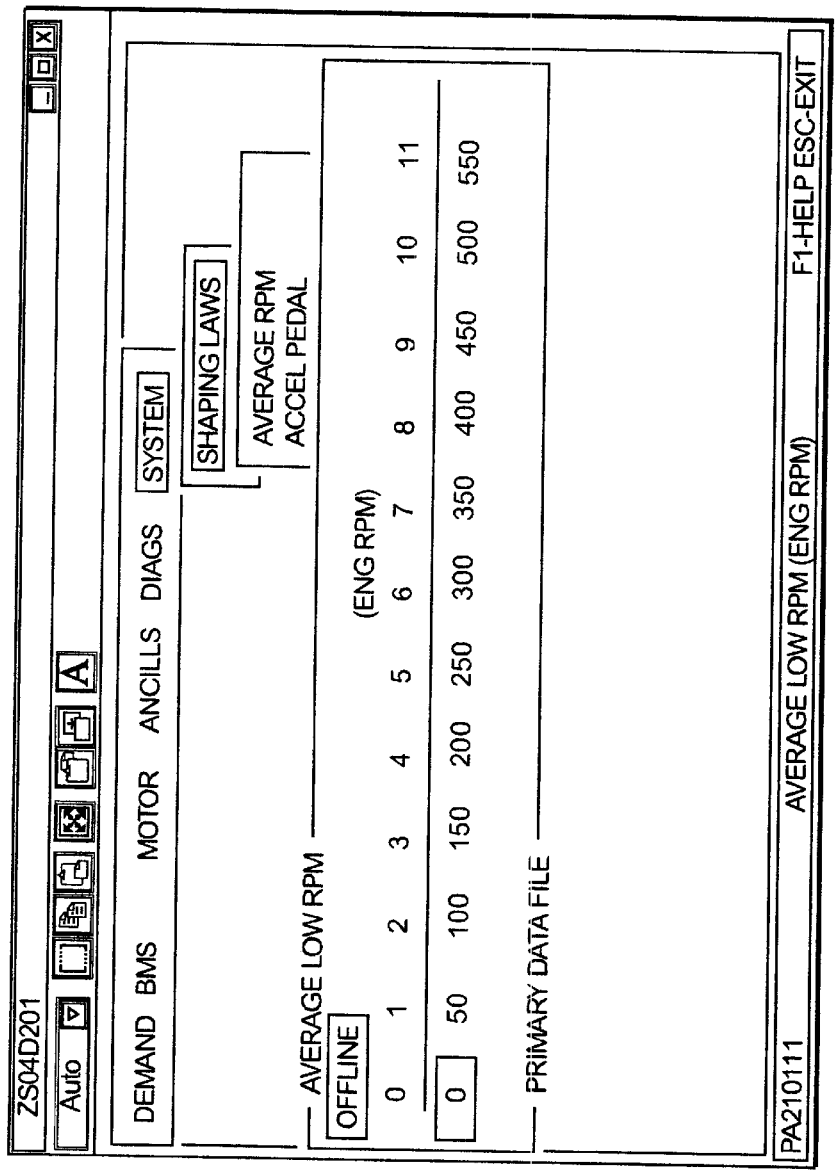
FIG. 26 illustrates the average rpm parameters as utilized by the present invention.
Figure 27:
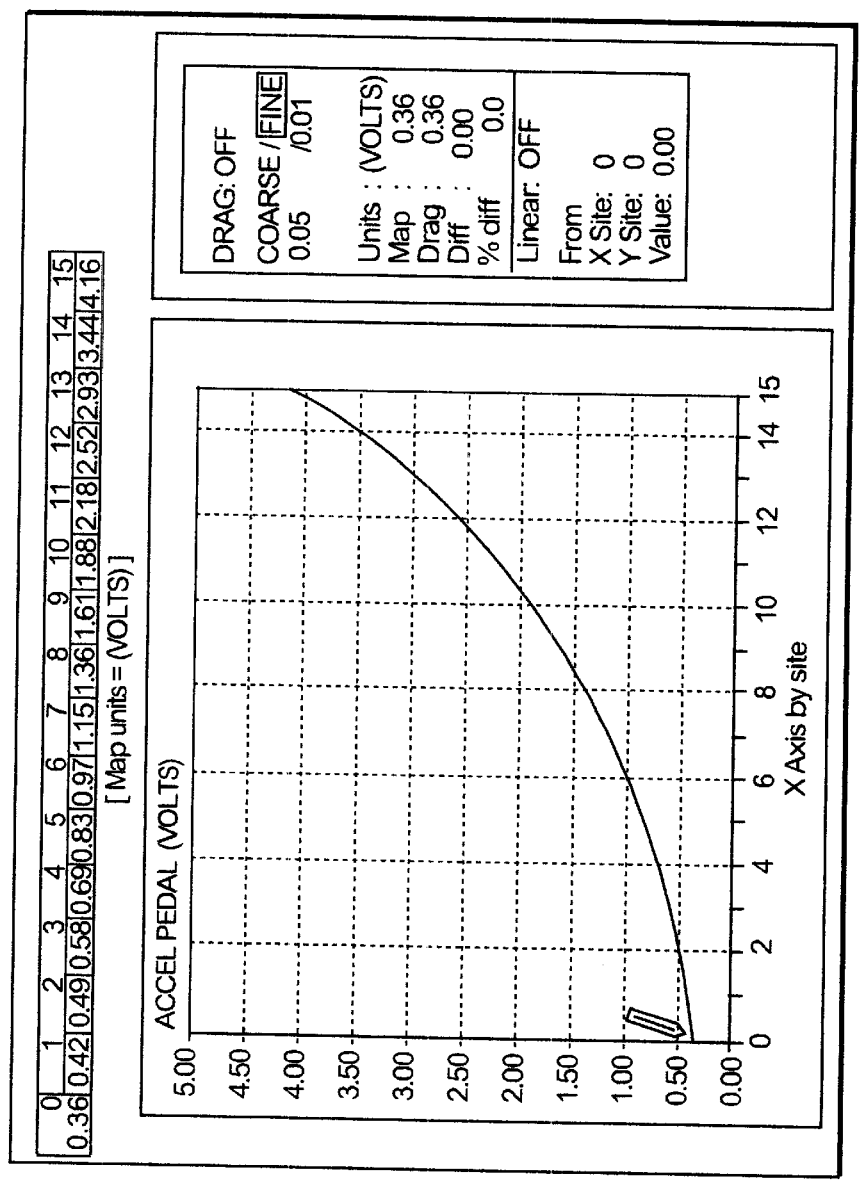
FIG. 27 illustrates the acceleration pedal parameter as utilized by the present invention.
Figure 28:
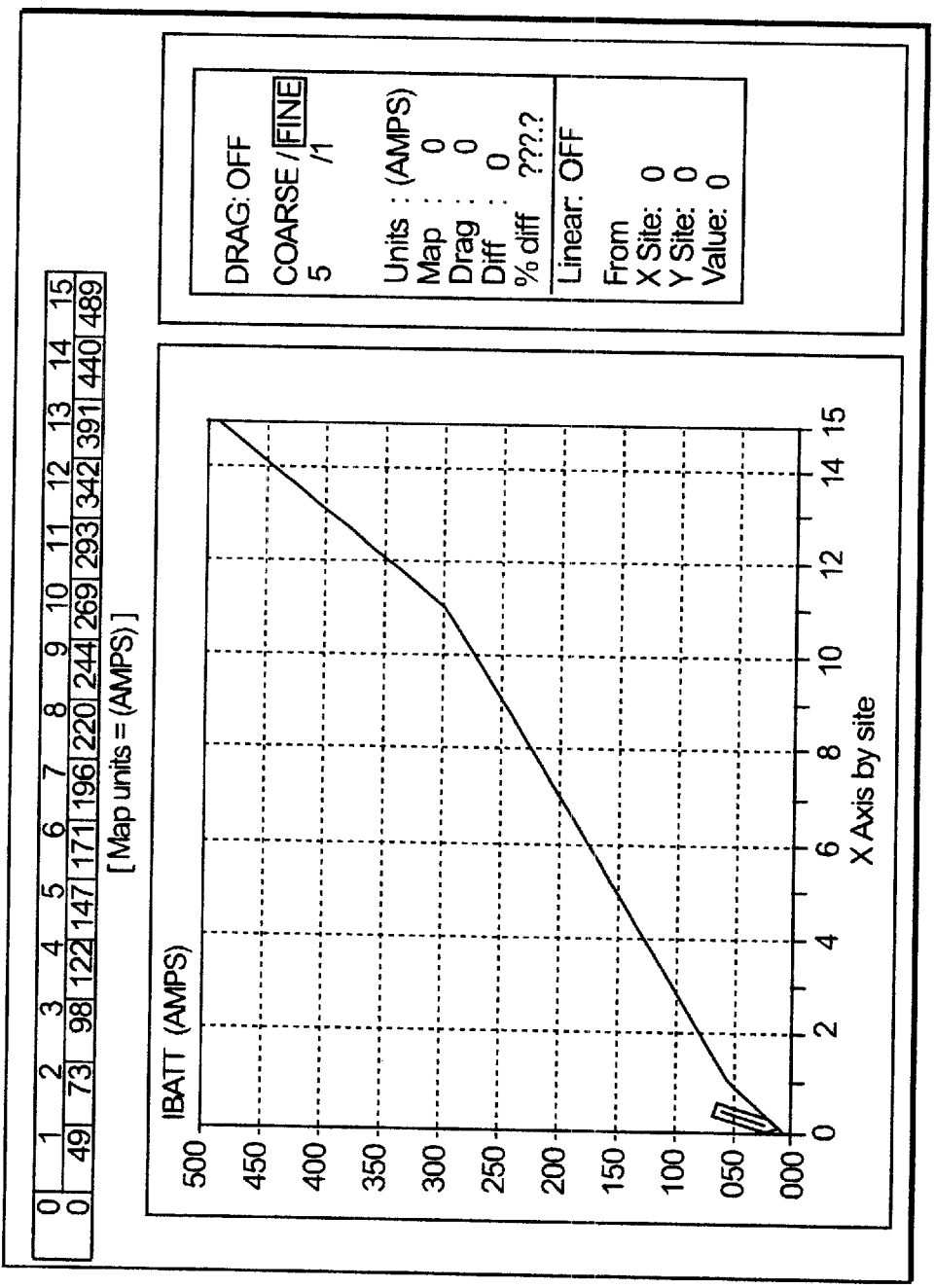
FIG. 28 illustrates the Ibatt parameter as utilized by the present invention.

As shown in FIG. 12, demand category 104 includes demand map selector 116 which will display the demand map. As shown in FIG. 24, the system category 114 includes a shaping category parameter which is utilized for shaping the demand table array. Shaping category 118 includes an average rpm category 120 and acceleration pedal category 122, which is further shown in FIGS. 25, 26 and 27, which enable an operator to set the array of data points, hence, shaping the demand map array.

Figure 13:
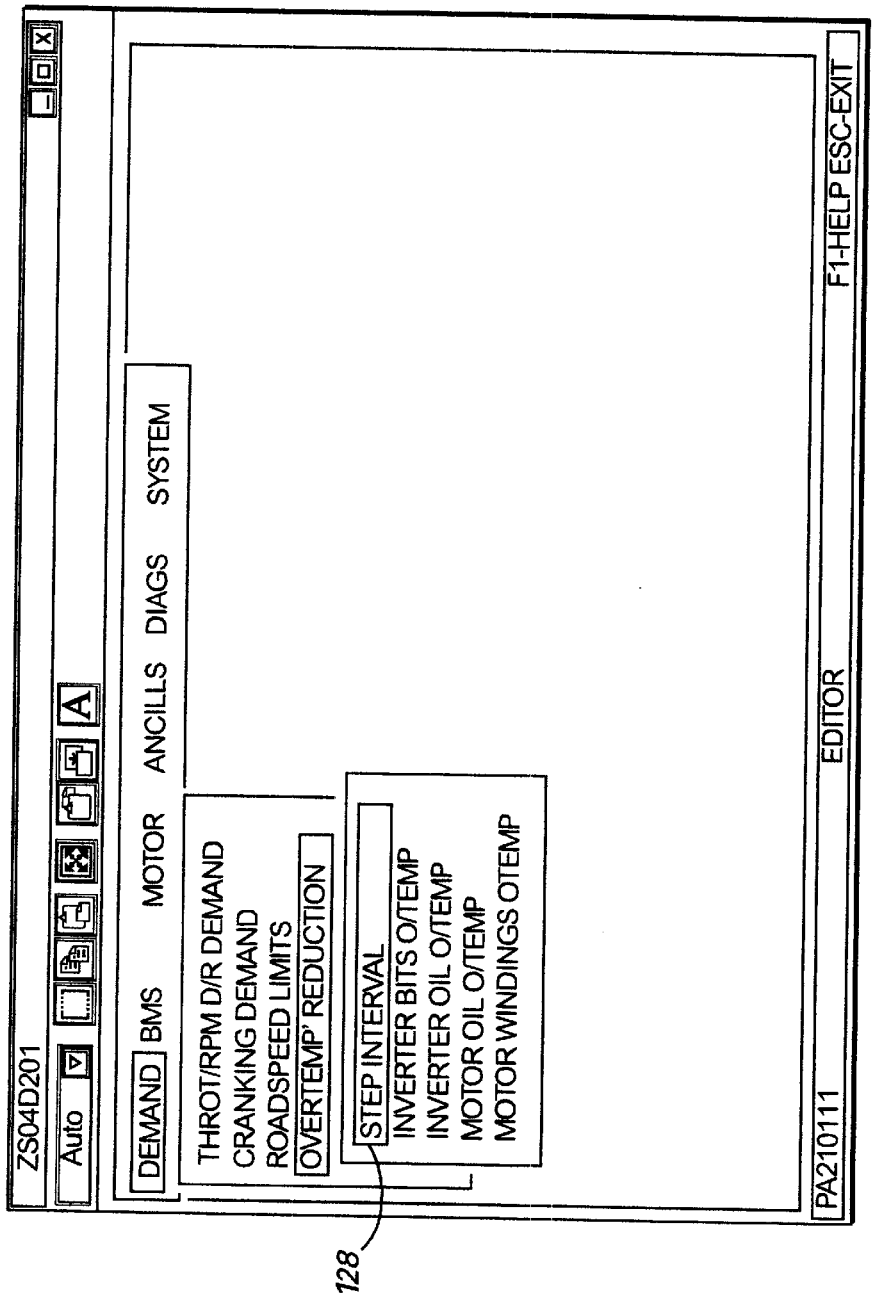
FIG. 13 illustrates the overtemp reduction parameter as used according to the present invention.
Figure 14:
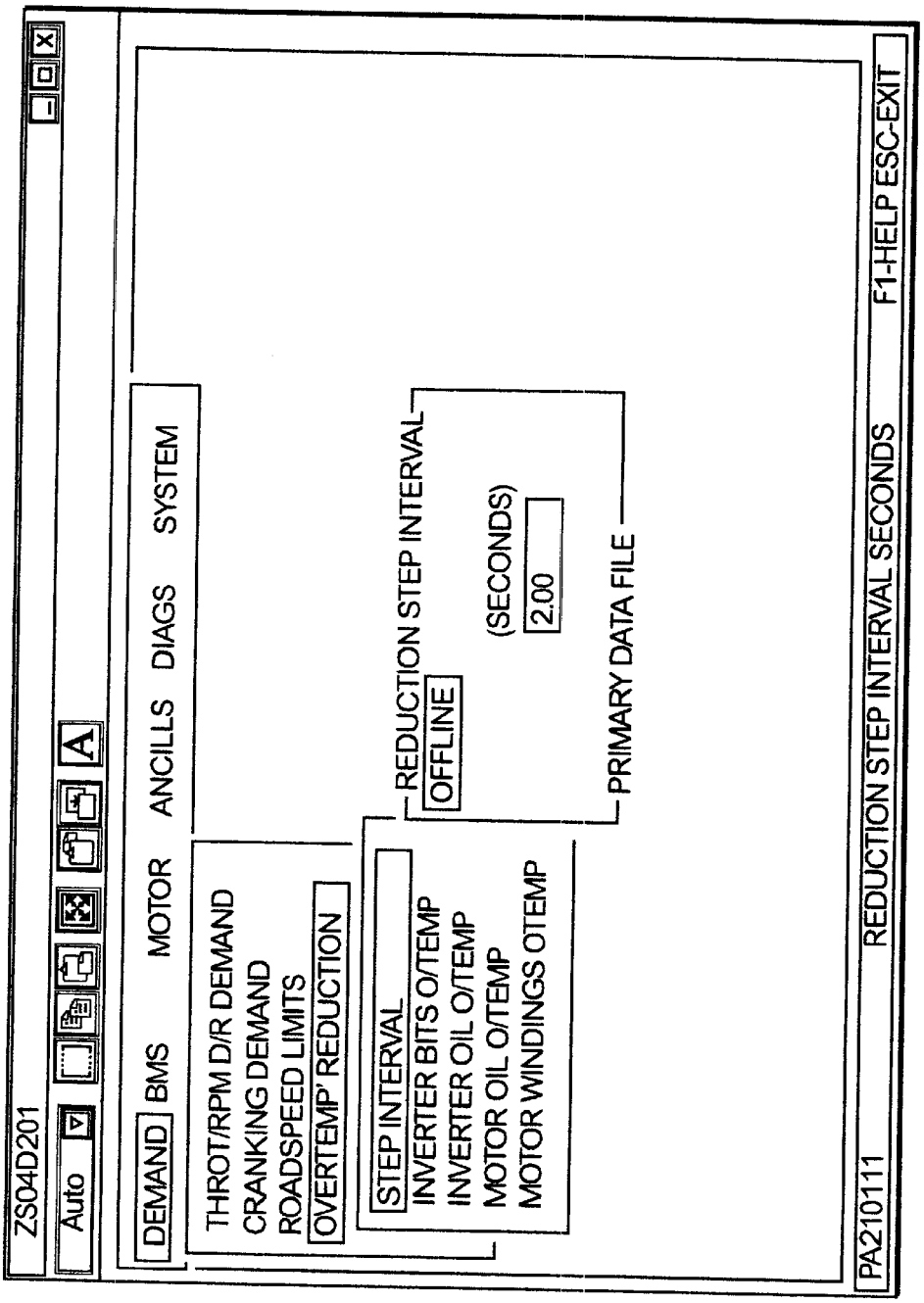
FIG. 14 illustrates the step time interval parameter as utilized according to the present invention.
Figure 15:
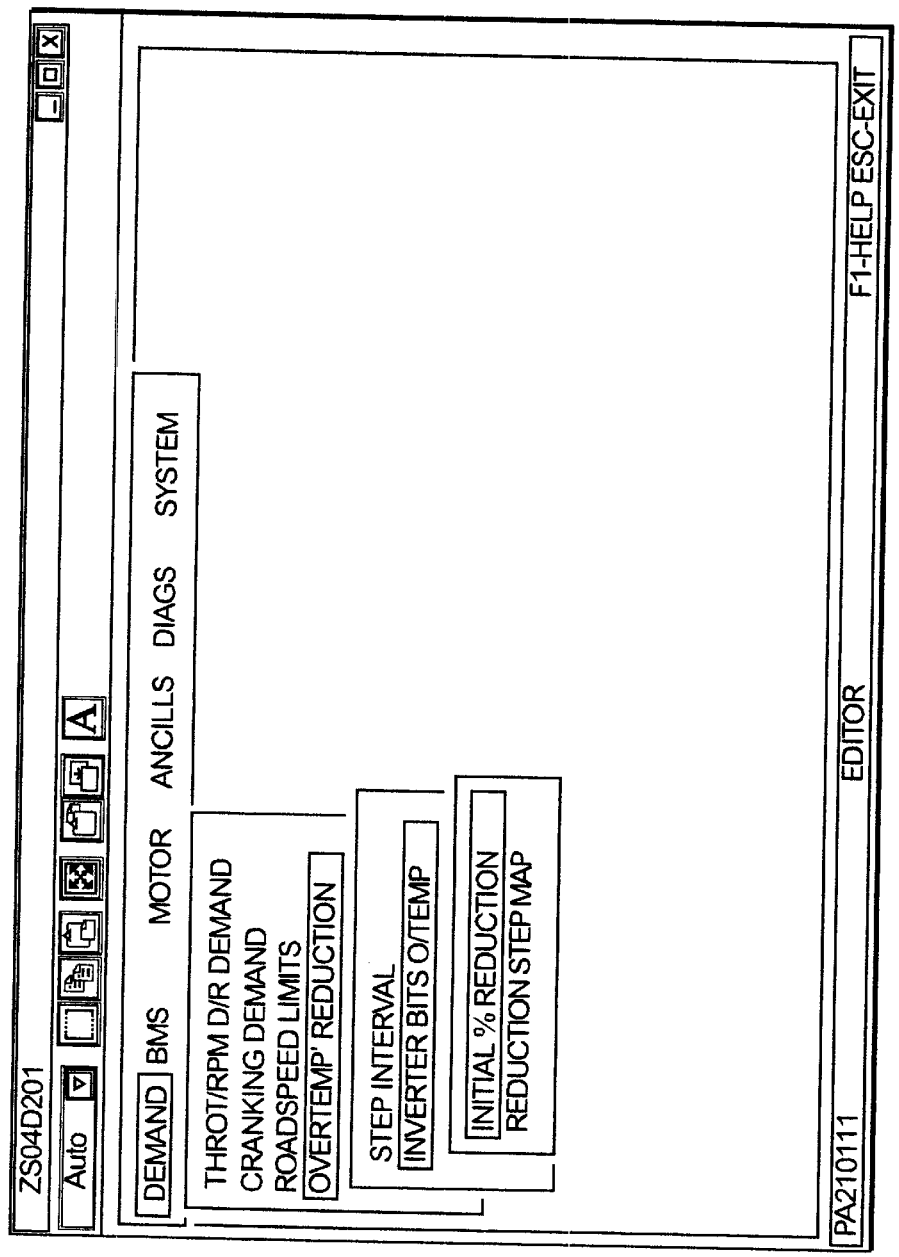
FIG. 15 illustrates the inverter percentage reduction parameter as utilized by the present invention.

FIG. 13 illustrates the overtemp reduction category and its related parameters which may include step interval, inverter oil and components temperature, inverter oil temperature, EMG oil temperature, and EMG windings temperature. As shown in FIG. 14, step interval 128 is a time delay parameter relating to checking particular inverter or EMG temperature if an over temperature condition has been previously reached. As shown in FIG. 15, the over temperature parameters contain percentages which the demand map is to be reduced by if an over temperature condition has been reached for the inverter. In the illustrated embodiment, other over temperature parameters exist for the EMG and battery. Also, the road speed demand table previously mentioned is located in demand category 104. Accordingly, all of the categories under the demand category 104 include parameters which relate to directing the inverter for controlling the EMG either to function in a EMG assist mode or in a regeneration mode either as directly indicated by demand table 72 or reduced as required by a limiting parameter.

Figure 16:
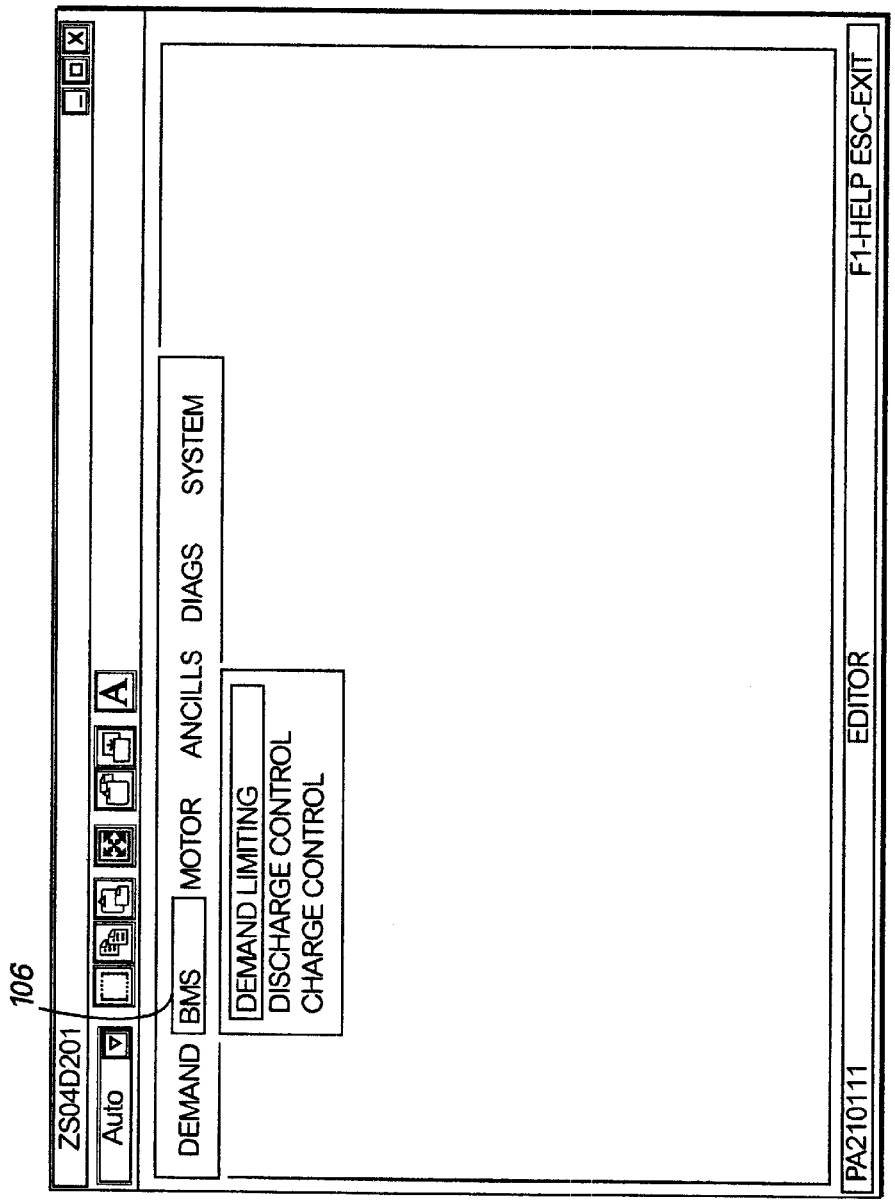
FIG. 16 illustrates the battery management system parameter as utilized by the present invention.
Figure 17:
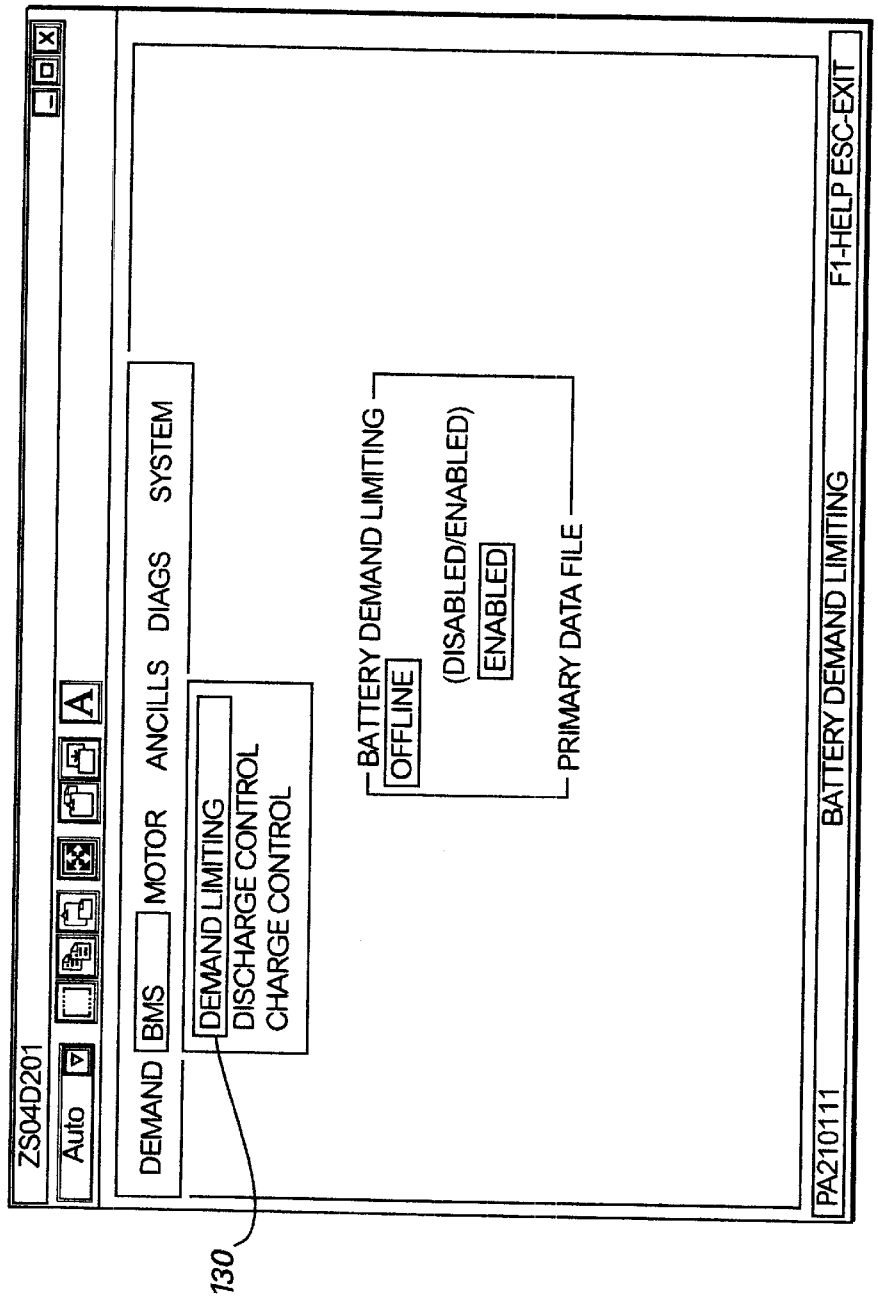
FIG. 17 illustrates the demand limiting parameter as utilized by the present invention.
Figure 18:
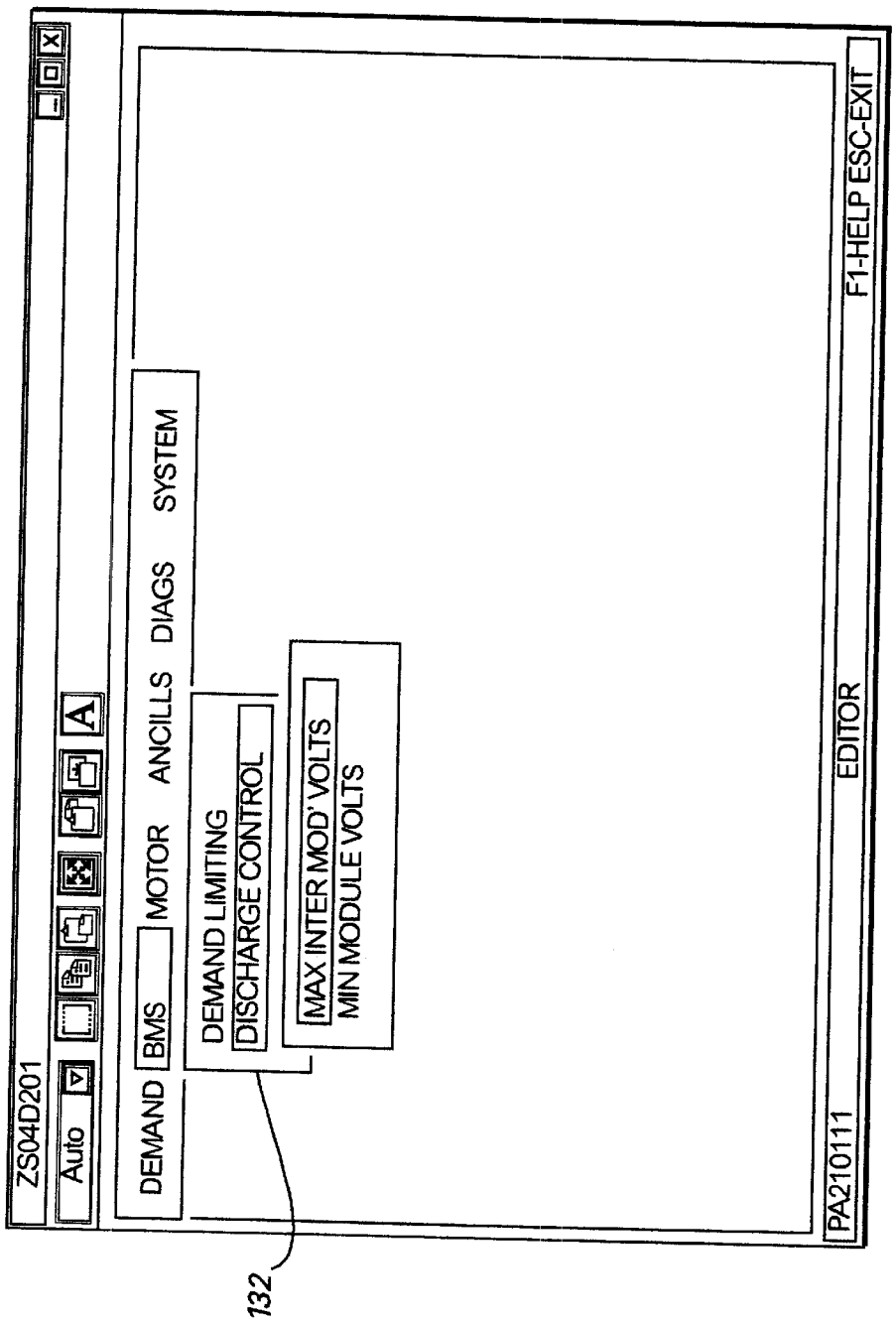
FIG. 18 illustrates the discharge control parameter as utilized by the present invention.
Figure 19:
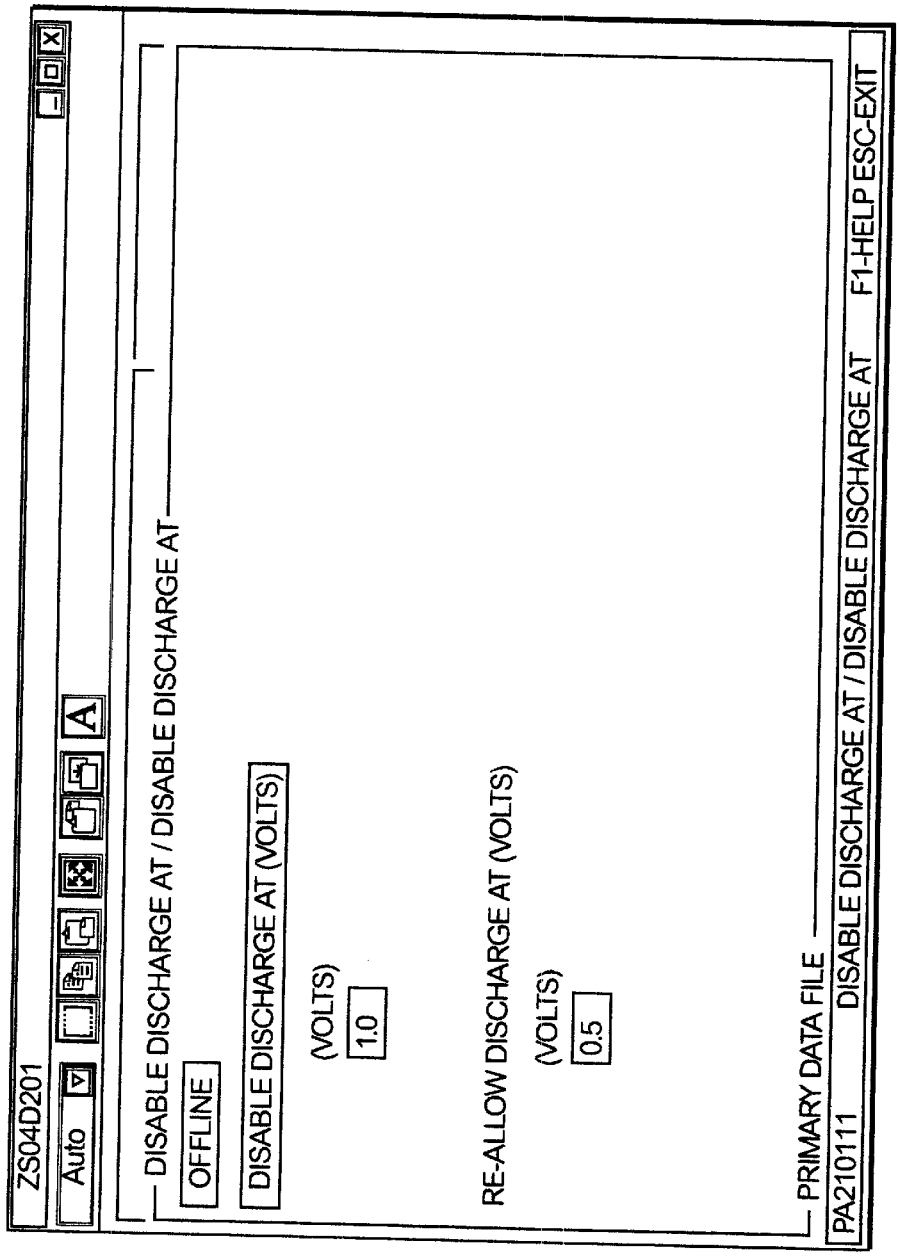
FIG. 19 illustrates the maximum inter module voltage parameter as utilized by the present invention.
Figure 20:
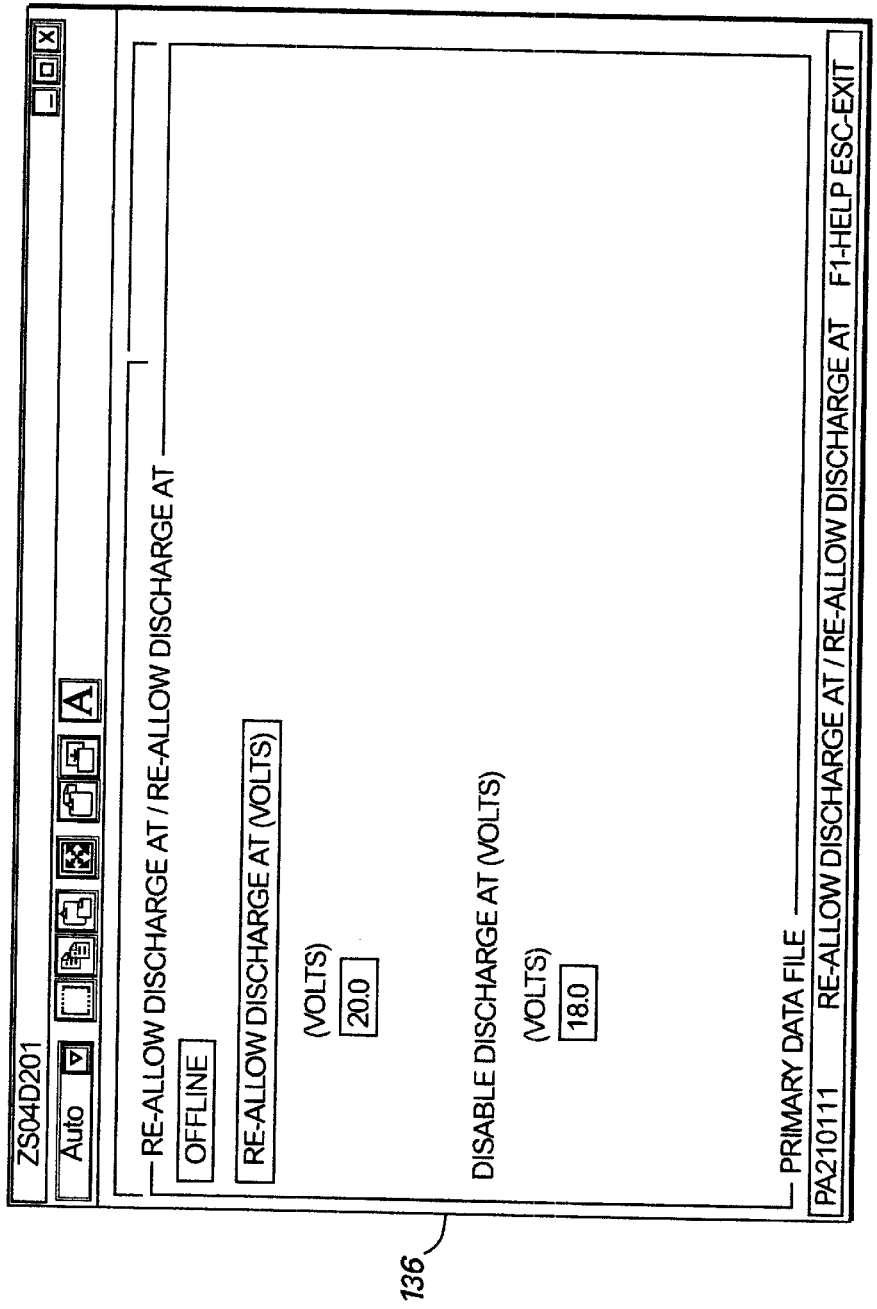
FIG. 20 illustrates the re-allowable discharge parameter as utilized by the present invention.

FIG. 16 illustrates the battery management system category 106. Demand limiting category 130 is illustrated in FIG. 17 and consists of an off/on switch to be employed by control system B such that if a battery condition exists which is not conducive to utilizing the battery system, then demand table 72 will not be utilized. As shown in FIGS. 18 through 20, two such demand limiting parameters include discharge control parameter 132 which includes a maximum inter-module voltage differential 134. As illustrated in FIG. 19, if the voltage between any respective modules is greater than one volt, than discharging of the battery will be limited. However, if the difference between voltage between respective modules is less than a half a volt, then discharge would be re-enabled. Likewise, as shown in FIG. 20, if any respective battery cell has a voltage less than a certain voltage, then discharge will not be allowed. Discharge parameter 136 is set at a level such that if the voltage of a particular cell is below this certain level then discharge will not be allowed. As shown in FIG. 20, disablement of discharge will occur if any particular cell has less than eighteen volts but will be reallowed once the voltages of the cells achieve twenty volts. This parameter prevents over discharge of the battery pack. Also, there are charge control parameters which will prevent overcharging of the respective battery cells of if a certain cell gas pressure is reached.

Figure 21:
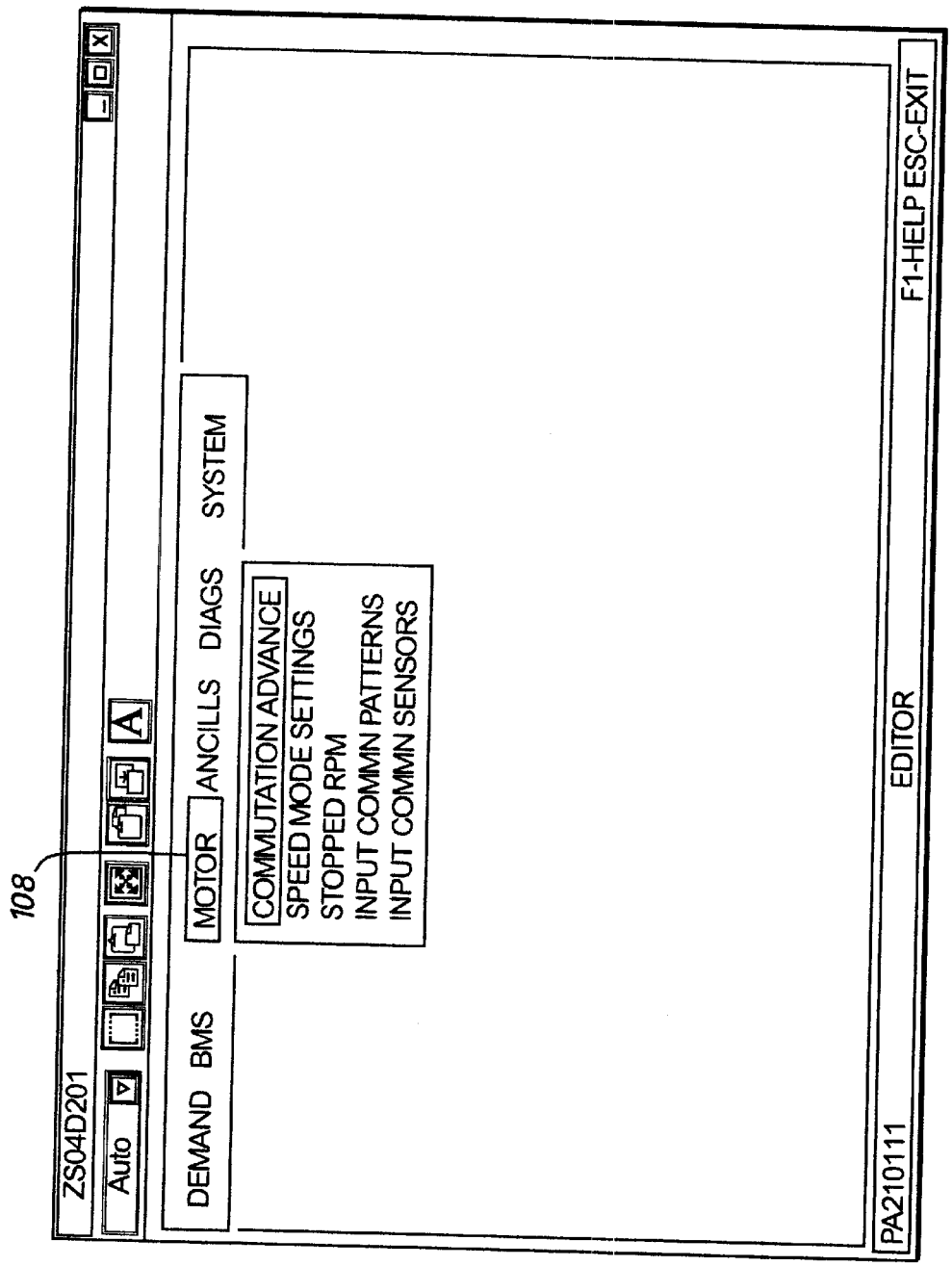
FIG. 21 illustrates the EMG category as utilized by the present invention.

FIG. 21 illustrates EMG category 108. EMG category 108 includes commutation advance category 138 which is utilized for establishing an advance mode. In the advanced mode, the particular EMG windings will be allowed to pre-charge to ensure the timeliness of the respective windings being charged in advance of the spinning rotor. This is utilized at high speeds to compensate for the increased speed of the commutator.

Figure 22:
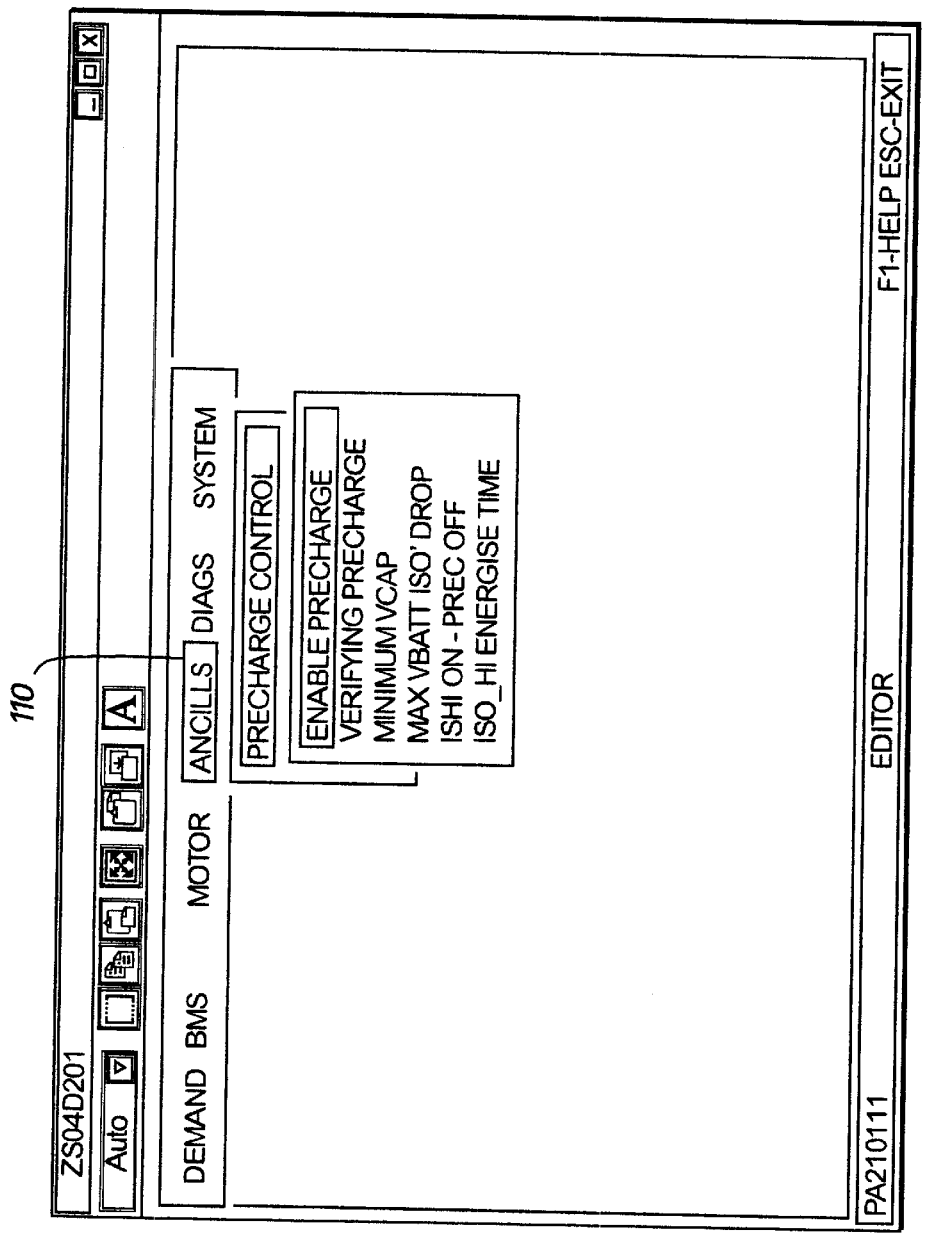
FIG. 22 illustrates the ancillary parameters as utilized by the present invention.

FIG. 22 illustrates ancillary category 110. Ancillary category 110 is utilized for establishing the initial operating characteristics of control system B. One such ancillary parameter may be precharge control wherein the precharging of the inverter is enabled.

Figure 23:
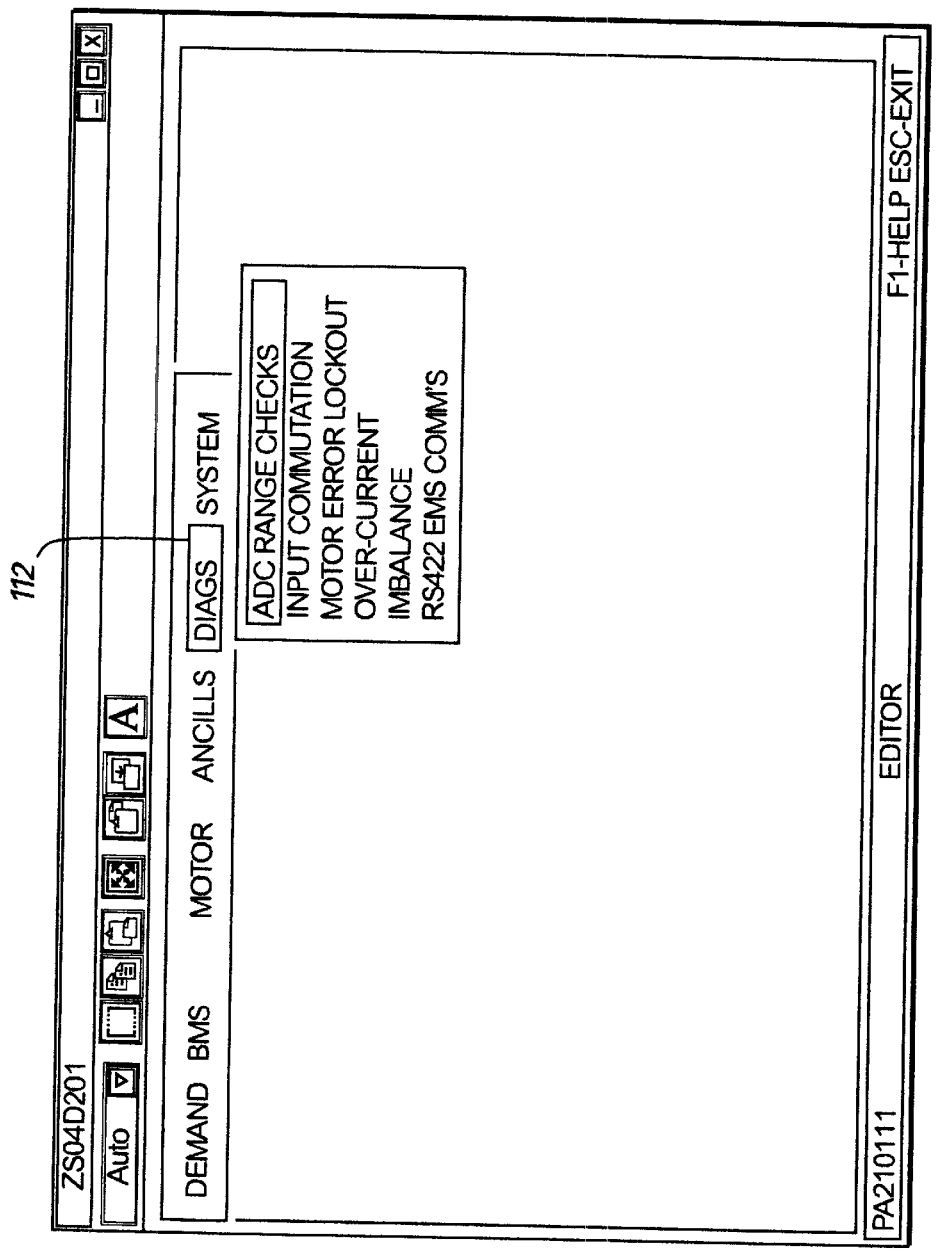
FIG. 23 illustrates the diagnostic parameters as utilized by the present invention.

FIG. 23 illustrates diagnostics category 112 which may include parameters relating to the communication between the respective components of control system B. In the preferred embodiment, engine management microprocessor and EMG controller microprocessor are connected through an RS422 communication circuit. Also, remote communication may be had from remote computer 84 which may contain graphical user interface 100 such that the operating parameters may be manipulated and transmitted to control system B. Computer 84 may send these parameters via microwaves to sensor 144 enabling control system B to be modified on the fly. Sensor 144 may then communicate the new parameters to EMG controller microprocessor and engine management microprocessor through another communication line which may be an RS232 or RS422. Control system B communicates over a CAN. Accordingly, diagnostics category 112 may include parameters for monitoring the internal circuitry of the sensors within control system B.

FIGS. 24 through 28 illustrate system category 114 wherein the parameters of the various control attributes are defined. Shaping law category 118 contains average rpm category 152 and acceleration pedal category 154. As previously defined with respect to demand table 72, these parameters are utilized to define demand table attributes establishing the demand parameter for the specific rpms and pedal position. Also, Ibatt enables the setting of the maximum battery current of which a percentage is utilized by the demand table for establishing the amount of current to be provided to EMG 20 by inverter 24 during EMG assist and regeneration. Road speed category 158 enables the shaping of road speed limiting map 80 and is the percentage which may be utilized to reduce demand table value depending on the respective road speed. Other parameters within shaping law category 118 include the over temperature values for the inverter and EMG including the winding temperatures and oil temperatures. These over temperatures values 160 are utilized to define the upper limit for the temperatures for these components.

Thus, it may be seen that a more advantageous control system may be had for a parallel hybrid vehicle wherein the application of EMG assist and regeneration by the EMG is controlled by demand map and limiting operational parameters. The demand map enables varying degrees of EMG assist to maximize the operation of the vehicle and also the regeneration of the batteries. Additionally, limiting operational parameters may limit the EMG assist or regeneration modes from the optimal settings depending on the operational environment. By utilizing limiting parameters such as traction control, components' temperature readings, and battery voltage readings, the integrity of the system may be achieved by ensuring that the control system component does not operate beyond the mechanical capabilities. These limiting parameters prevent mechanical breakdown and also operate to instruct when the application of EMG assist and regeneration is desirable. Additionally, the use of different demand maps having different control parameters may be utilized during the operation of the hybrid vehicle when the hybrid vehicle is operating at different driving environments. Additionally, the programmable nature of the control system enables the hybrid vehicle to be programmed and reprogrammed for optimal performance at varying operating environments.

What is claimed is as follows:

1. A vehicular power system for powering a parallel hybrid vehicle, the parallel hybrid including an internal combustion engine powered by fossil fuel, an electric motor/generator, and a battery source for powering the electric motor/generator, a inverter regulates the flow of current from the battery source to the electric motor/generator, said vehicle power system comprising:

a first demand map providing a first set of demand parameters for controlling the current between said battery and said electrical electric motor/generator corresponding to the operation of said vehicle in a first external operating environment simultaneously utilizing both said internal combustion engine and said electric motor to power said hybrid vehicle;

a second demand map having a second set of demand parameters for controlling the amount of current between said battery and said electric motor/generator corresponding to the operation of said vehicle in a second external operating environment simultaneously utilizing both said internal combustion engine and said electric motor to power said hybrid vehicle;

said first and second demand map being independently selectable from one another and;

a selector for selecting between said first and second demand maps depending upon an external operating environment.

2. A control system for powering a parallel hybrid vehicle, the parallel hybrid vehicle including an internal combustion engine powered by fossil fuel, an electric motor/generator, and a battery for powering the electric motor/generator, an inverter for regulating the flow of current between the energy source to the electric motor/generator, comprising:

a first set of demand parameters for indicating the desired amount of current to be delivered between said energy source and electric motor/generator as controlled by said inverter;

at least one sensor for sensing the voltage of said battery for controlling said inverter in providing said desired current to said electric motor/generator;

an upper hysteresis band limit established at a predetermined point above said desired current value;

a lower hysteresis band limit established at a predetermined level below said desired current value;

said inverter controlling the presentation of current from said electrical storage device to said electrical motor generator until said current reaches said upper hysteresis band limit and said inverter subsequently controlling the presentation of current from said electrical storage device to said electrical motor generator until said current reaches said lower hysteresis band limit; and said inverter repeating the presentation of current from said electrical storage device to said electrical motor generator between said upper and lower hysteresis band limits.

* * * * *